(12) United States Patent
Jayaram et al.

(10) Patent No.: US 7,149,677 B2
(45) Date of Patent: *Dec. 12, 2006

(54) GEOMETRIC MODEL COMPARATOR AND METHOD

(75) Inventors: Sankar Jayaram, Pullman, WA (US); Uma Jayaram, Pullman, WA (US); Michael M. McDonald, Colbert, WA (US); Robert Sorenson, Coeur d'Alene, ID (US); Daniel Evans, West Richland, WA (US); David Cramer, Pullman, WA (US)

(73) Assignee: Translation Technologies, Inc., Spokane, WA (US)

( * ) Notice: Subject to any disclaimer, the term of this patent is extended or adjusted under 35 U.S.C. 154(b) by 762 days.

This patent is subject to a terminal disclaimer.

(21) Appl. No.: 09/999,097

(22) Filed: Oct. 30, 2001

(65) Prior Publication Data

US 2003/0135846 A1    Jul. 17, 2003

Related U.S. Application Data

(60) Provisional application No. 60/243,848, filed on Oct. 30, 2000.

(51) Int. Cl.
*G06F 9/45* (2006.01)

(52) U.S. Cl. .............................. 703/22; 703/7; 345/419; 345/420; 345/622; 345/672; 250/344

(58) Field of Classification Search .................... 703/7, 703/22; 345/419, 420, 622, 672; 250/334, 250/344; 702/35; 707/201, 205, 104.1; 382/113

See application file for complete search history.

(56) References Cited

U.S. PATENT DOCUMENTS

| 4,831,549 A | 5/1989 | Red et al. ................... 364/513 |
| 4,847,788 A | 7/1989 | Shimada ..................... 364/522 |
| 4,943,933 A | 7/1990 | Miyamoto et al. .......... 364/513 |
| 5,212,770 A | 5/1993 | Smith et al. ................. 395/155 |
| 5,369,744 A | 11/1994 | Fukushima et al. ......... 395/162 |
| 5,493,679 A * | 2/1996 | Virgil et al. ............. 707/104.1 |
| 5,581,665 A | 12/1996 | Sugiura et al. ............... 395/86 |
| 5,615,317 A | 3/1997 | Freitag ....................... 395/119 |
| 5,691,909 A | 11/1997 | Frey et al. ............. 364/474.01 |
| 5,715,459 A | 2/1998 | Celi, Jr. et al. ............. 395/681 |

(Continued)

FOREIGN PATENT DOCUMENTS

WO    WO 02/37406 A1    10/2001

OTHER PUBLICATIONS

LaCourse, "3Dmodelserver translates and heals models via the web", CADalyst, Feb. 2000.*

(Continued)

*Primary Examiner*—Kandasamy Thangavelu
(74) *Attorney, Agent, or Firm*—Wells St. John P.S.

(57) ABSTRACT

A geometric model comparator is provided, which includes processing circuitry, memory, and comparison circuitry. The processing circuitry is configured to generate a target model from a source model. The memory is configured to store the source model and the target model. The comparison circuitry is configured to identify selected points from the source model, create corresponding selected points in a target model, and compare the selected points from the source model with the selected points from the target model to identify one or more selected points from the target model that fall outside of a predetermined tolerance range with the respective one or more points from the source model. A method is also provided.

29 Claims, 16 Drawing Sheets

U.S. PATENT DOCUMENTS

| | | | |
|---|---|---|---|
| 5,745,761 A | 4/1998 | Celi, Jr. et al. | 395/681 |
| 5,745,762 A | 4/1998 | Celi, Jr. et al. | 395/681 |
| 5,813,018 A | 9/1998 | Kaji et al. | 707/502 |
| 5,825,368 A | 10/1998 | Wilks | 345/440 |
| 5,892,939 A | 4/1999 | Call et al. | 395/500 |
| 5,966,673 A * | 10/1999 | Shannon, Sr. | 702/35 |
| 5,990,897 A | 11/1999 | Hanratty | 345/420 |
| 6,134,338 A * | 10/2000 | Solberg et al. | 382/113 |
| 6,173,075 B1 | 1/2001 | Collins | 382/203 |
| 6,188,432 B1 | 2/2001 | Ejima | 348/240 |
| 6,205,452 B1 | 3/2001 | Warmus et al. | 707/500 |
| 6,211,814 B1 | 4/2001 | Benjamin et al. | 342/185 |
| 6,326,964 B1 * | 12/2001 | Snyder et al. | 345/419 |
| 6,420,698 B1 * | 7/2002 | Dimsdale | 250/234 |
| 6,603,484 B1 * | 8/2003 | Frisken et al. | 345/622 |
| 6,614,430 B1 * | 9/2003 | Rappoport | 345/420 |
| 6,671,701 B1 * | 12/2003 | Chouinard | 707/201 |
| 6,721,769 B1 * | 4/2004 | Rappaport et al. | 707/205 |
| 6,828,963 B1 * | 12/2004 | Rappoport | 345/419 |
| 6,847,384 B1 * | 1/2005 | Sabadell et al. | 345/672 |
| 2002/0060650 A1 | 5/2002 | Wakashiro et al. | 345/9 |
| 2002/0120920 A1 | 8/2002 | Jayaram et al. | 717/137 |
| 2002/0123812 A1 | 9/2002 | Jayaram et al. | 700/98 |
| 2002/0143823 A1 | 10/2002 | Stevens | 707/523 |
| 2003/0009315 A1 | 1/2003 | Thomas et al. | 703/1 |
| 2003/0156127 A1 * | 8/2003 | Kleyman | 345/672 |
| 2005/0046624 A1 * | 3/2005 | Jayaram et al. | 345/419 |

OTHER PUBLICATIONS

Kroszynski et al., "Geometric data transfer between CAD systems: Solid models", IEEE 1989.*

Marti, "Viewing IGES files through VRML", IEEE 1997.*

Clark et al., "STEP AP203 data exchange study", ACM 1995.*

* cited by examiner

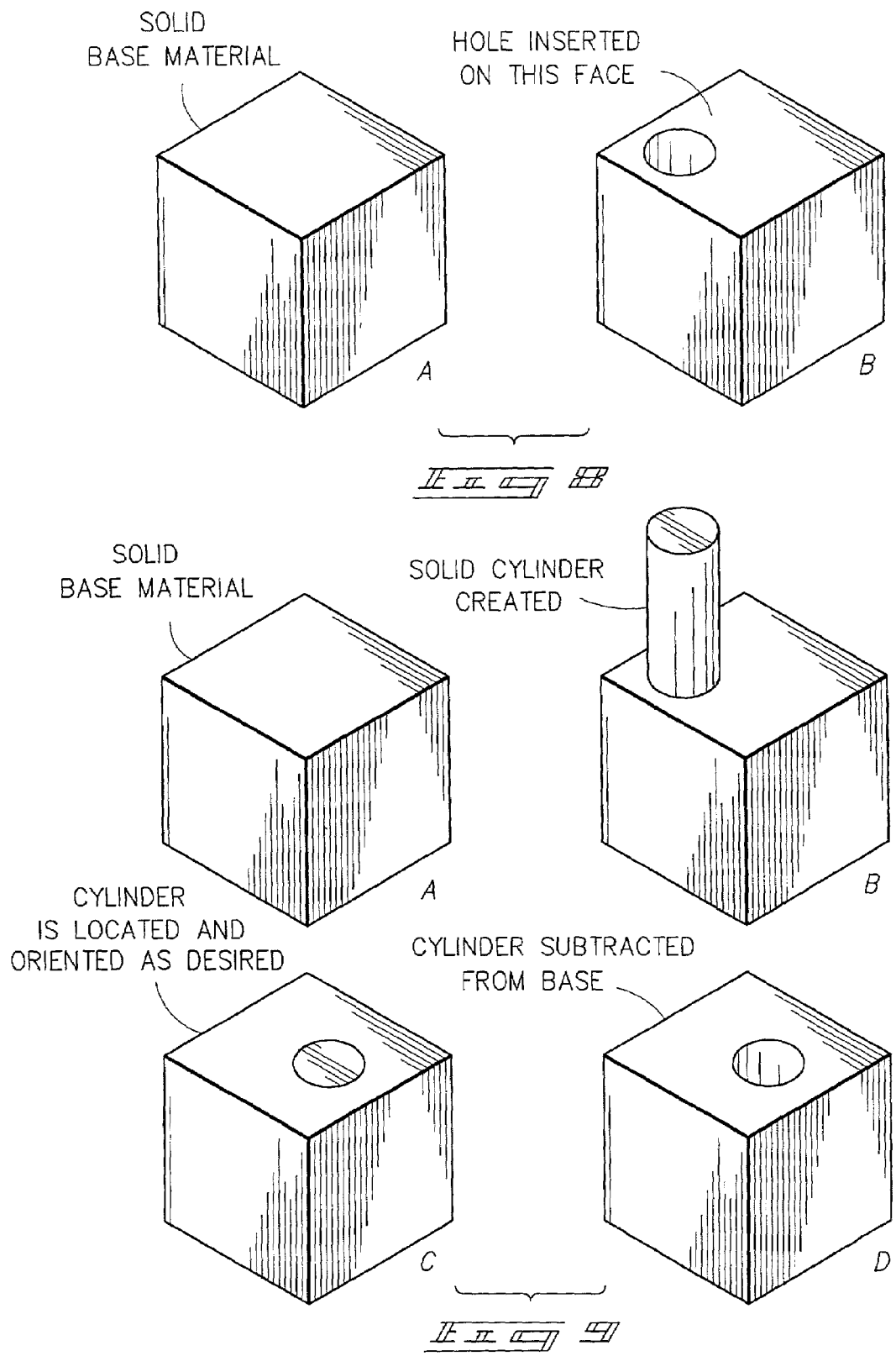

FEATURE BASED TREE
P₁
P₂
P₃
P₄
P₅
C₁
P₆
P₇
P₈
C₂

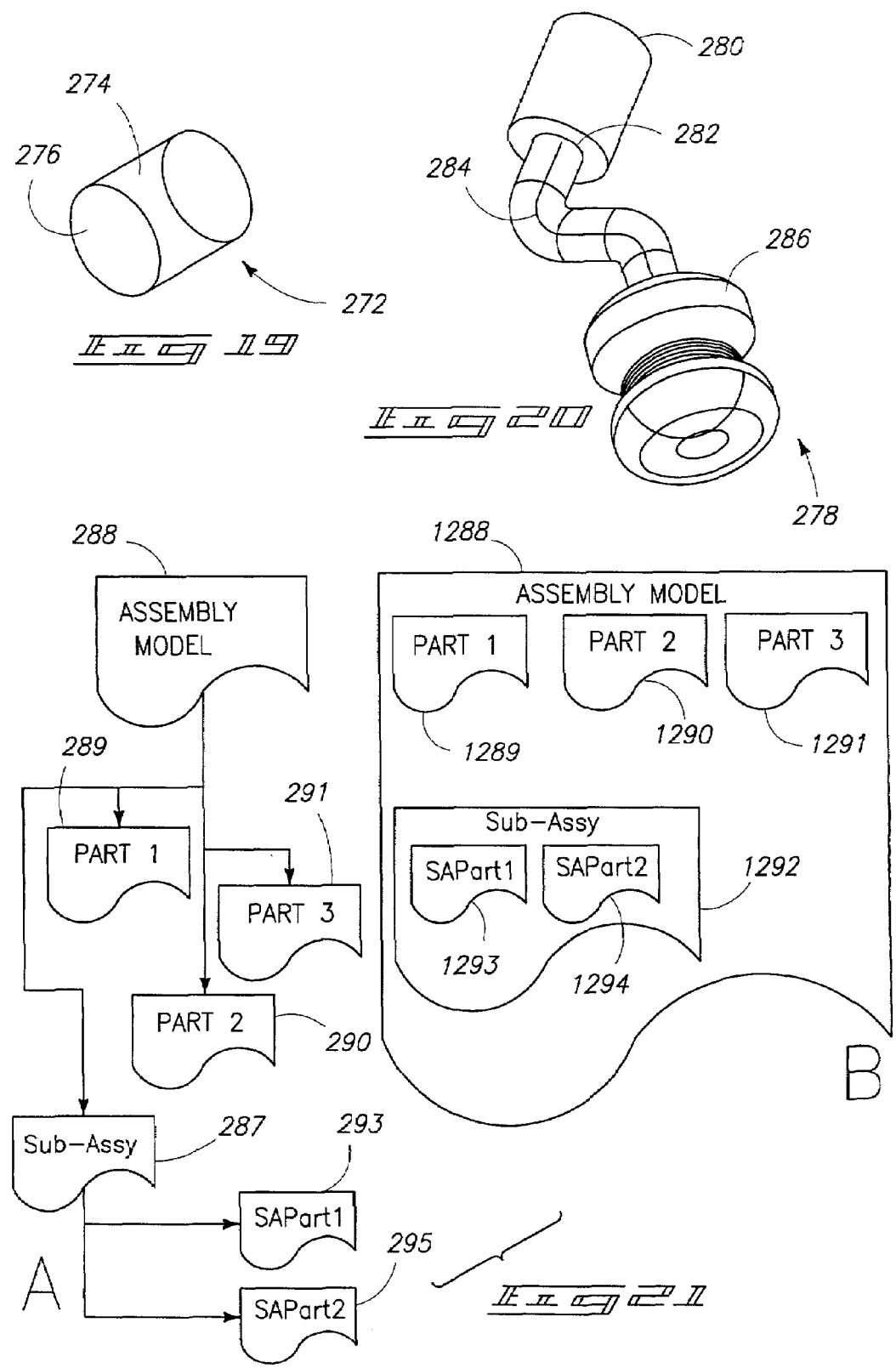

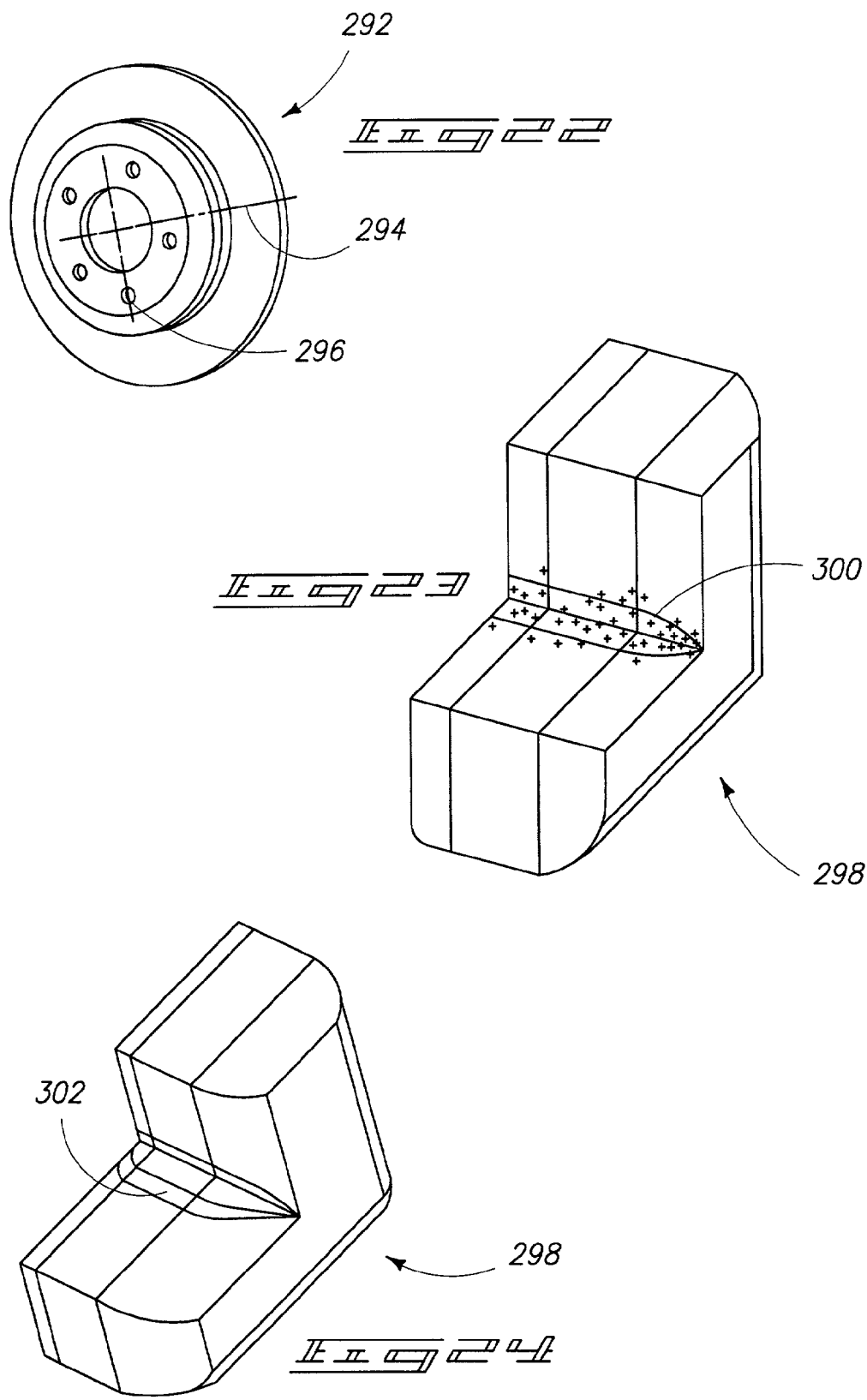

GEOMETRIC MODEL COMPARATOR AND METHOD

CROSS-REFERENCE TO RELATED APPLICATIONS

This application claims the benefit of U.S. Provisional Patent Application Ser. No. 60/243,848, which was filed on Oct. 30, 2000, and which is incorporated by reference herein.

Additionally, this application is filed concurrently with a co-pending patent application entitled "Computational Geometry System, Interrupt Interface, and Method", the disclosure of which is also incorporated by reference herein.

TECHNICAL FIELD

This invention pertains to drawing conversion. More particularly, this invention relates to computer aided design file translation including a geometric model comparator.

BACKGROUND OF THE INVENTION

Practically every product that results from the efforts of generic design or specialized design, such as architectural, electrical and mechanical design, involves the rendering of design drawings. In the last twenty years, nearly all of such drawings have been rendered using a computer aided design (CAD) system with a CAD software program. Typical CAD systems take the form of high-speed workstations or desktop computers that use CAD design software and input devices. These CAD systems generate output in the form of a printed design drawing or an electronic file format that can provide input to a computer aided manufacturing system (CAM).

Since the advent of computerized drawings, numerous computer aided design (CAD) programs have been developed. The translation of data files created by a first computer aided design (CAD) program into one or more data files readable by a second CAD program proves to be a difficult task. However, because of the relatively large number of diverse and competing CAD programs that are available, it is frequently the case that such translations need to be made. A number of underlying reasons exist for performing such translations, including execution of engineering projects that require the services of a main contractor using a first CAD program and a subcontractor using a second CAD program.

A presently existing technique for translating drawings involves the use of a Document eXchange Format file (DXF file). DXF files comprise an AutoCAD 2-D graphics file format. Numerous CAD systems are provided with the capability to import and export the DXF file format for graphics interchange, in the form "filename.dxf". The DXF file format enables relatively simple files to be saved in DXF format via a first CAD program, and then read via a second CAD program. The DXF file format results in a generally fair translation accuracy where the files are not relatively complex. However, for typically involved applications, DXF file format does not provide a complete solution for translating files.

Accordingly, there exists a present need for an apparatus and method that enables translation of CAD files between at least two unique CAD file types, such as from a first CAD file type into a second CAD file type.

SUMMARY OF THE INVENTION

This invention concerns a computational geometry system having a geometric model comparator that identifies discrepancies between target geometric data and source data by comparing the target geometric data with the source geometric data. The computational geometry system can be provided via a network client/server architecture or via a stand-alone workstation.

According to one aspect, a method is provided for managing computational geometry system translations. The method includes providing a server and at least one client within a client/server network environment; receiving source geometric data at the server within a memory; generating target geometric data using the source geometric data; and identifying discrepancies between the target geometric data and the source geometric data by comparing the target geometric data with the source geometric data.

According to another aspect of the invention, a machine-executed method is provided for implementing a geometric conversion on a computer system including an interface. The method includes receiving a source geometric model at a computer; storing the source geometric model in memory of the computer; converting the source geometric model to a target geometric model; extracting source comparison reference data from the source geometric model; extracting target comparison reference data from the target geometric model; and comparing the comparison reference data from one of the source geometric model and the target geometric model with geometry from one of the target geometric model and the source geometric model, respectively, to identify geometric discrepancies therebetween.

According to yet another aspect of this invention, a geometric translation system is provided having processing circuitry, memory, and comparison circuitry. The processing circuitry is configured to generate a target model from a source model. The memory is configured to store the source model and the target model. The comparison circuitry is configured to identify selected points from the source, create corresponding selected points in a target model, and compare the selected points from the source model with the selected points from the target model to identify one or more selected points from the target model that fall outside of a predetermined tolerance range with respect to one or more points from the source model.

According to even another aspect of this invention, a geometric translation system includes memory, processing circuitry, and a geometric model comparator. The memory is configured to receive input data of a source model. The processing circuitry is configured to convert the input data of the source model into corresponding output data of a target model. The geometric model comparator is configured to compare the input data with the corresponding output data and identify geometric discrepancies between the input data and the output data.

According to yet even another aspect of this invention, a machine-executed method is provided for implementing a geometric conversion on a computer system including an interface. The method includes: receiving a source geometric model at a computer; storing the source geometric model in memory of the computer; converting the source geometric model to a target geometric model; extracting reference data from one of the source geometric model and the target geometric model; importing reference data into one of the target geometric model and the source geometric model; comparing the extracted reference data for discrepancies with geometry from one of the target geometric model and the source geometric model in one of a target CAD system and a source CAD system.

One advantage of the present invention is to provide a novel method and apparatus for computer aided design file translation having a geometric analyzer for CAD file comparison which determines if a translated CAD file (the output, created by the translation) is geometrically identical to the original source CAD file from which it was translated.

Another advantage of the present invention is to provide a method and apparatus for computer aided design file translation including a geometric analyzer for CAD file comparison that uses point cloud extraction, including tessellated, surface and edge points.

A still further advantage of the present invention is to provide a method and apparatus for computer aided design file translation including a geometric analyzer for CAD file comparison that uses a stand-alone point cloud analyzer to increase the speed of the analysis.

BRIEF DESCRIPTION OF THE DRAWINGS

Preferred embodiments of the invention are described below with reference to the following accompanying drawings.

FIGS. 8A–8B are simplified schematic diagrams illustrating the creation of a hole in a solid cube of material utilizing Pro/E.

FIGS. 9A–9D are simplified schematic diagrams illustrating the creation of a hole in a solid cube of material utilizing CATIA.

FIG. 19 is a simplified schematic diagram illustrating a solid cylinder created by generating B-Rep surfaces in order to enclose a volume.

FIG. 20 is a simplified schematic diagram illustrating a solid model geometry created by extruding a circle section to create a cylinder, sweeping another circle along a trajectory to add a swept feature, and revolving a complex section to create a revolve feature.

FIGS. 21A and B are simplified schematic data flow charts illustrating two methods for storing assembly model data.

FIG. 22 is a simplified schematic diagram illustrating a relationship between the location of a hole and a revolve axis of a part identified in a model.

FIG. 23 is a simplified schematic diagram illustrating an exemplary target model having bad points.

FIG. 24 is a simplified schematic diagram illustrating a surface from a source model provided on a target model.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention relates to a computer-implemented technique for implementing a geometric model comparator. The comparator includes processing circuitry that is configured to generate a target model from a source model. The comparator also includes memory that is configured to store the source model and the target model. Furthermore, the geometric model comparator includes comparison circuitry (provided by processing circuitry and program code) that is configured to identify selected points from the source model, create corresponding selected points in the target model, and compare the selected points from the source model with the selected points from the target model in order to identify one or more selected points from the target model that fall outside of a predetermined tolerance range with respect to one or more points from the source model. In one case, the comparison circuitry implements a forward comparison between the selected points from the source model and the respective selected points from the target model. In another case, this comparison circuitry implements a reverse comparison between the selected points. In even another case, the comparison circuitry implements a bi-directional comparison between the selected points from the source model and the respective selected points from the target model.

Reference will now be made to a preferred embodiment of Applicant's invention. One exemplary implementation is described below and depicted with reference to the drawings comprising a system and method for identifying selected points from a target model that fall outside of a predetermined tolerance range with respect to one or more points from a source model. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art. Furthermore, U.S. Provisional Patent Application Ser. No. 60/243,848, filed Oct. 30, 2000, is incorporated by reference herein.

Figure 1:
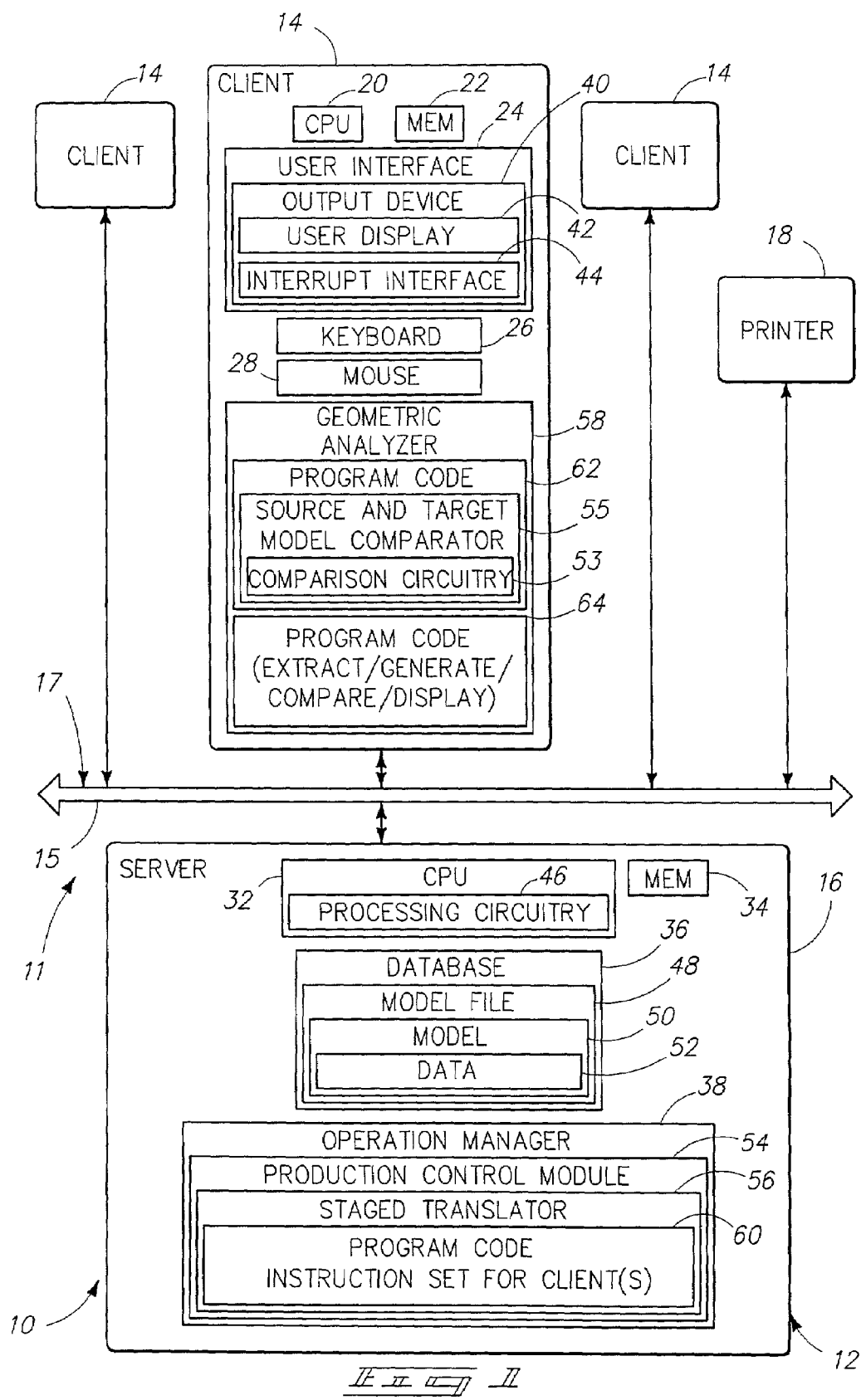
FIG. 1 is a block diagram overview of a basic system configuration of an exemplary system for implementing computer aided design file translation according to one embodiment of the present invention.

FIG. 1 illustrates a preferred embodiment of Applicant's invention wherein a basic system configuration is provided for comparing input data with output data, identifying geometric information from a target model that falls outside of a tolerance range relative to respective geometric information from a respective source model, and is identified with reference numeral 10. Geometric model comparator 10 is provided by a computer aided design (CAD) file translation system 12. In one form, system 12 is implemented in a distributed manner across a local area network (LAN) 11, such as a client/server network 13, within a LAN environment. However, it is understood that system 12 can also be implemented on a single, stand-alone workstation, such as on a central personal computer.

As shown in FIG. 1, system 12 is implemented across a client/server network 13 having a plurality of clients 14 connected via a communication link 15 with a server 16. In one form, communication link 15 comprises a local area network (LAN) connection 17. According to alternative constructions, a plurality of servers similar to server 16 are included within LAN 11. Further alternatively, server 16 and client 14 can be provided by the same device for the case of a stand-alone workstation. Optionally, for the case of a distributed client/server network implementation server 16 can include a client, similar to client 14. Even furthermore, system 12 can include a single client 14, according to an alternative construction. System 12 also includes a printer 18 provided within LAN 11.

As shown in FIG. 1, client 14 in one construction comprises a client computer having a central processing unit (CPU) 20, memory 22, a user interface 24, a keyboard 26, a mouse 28, a geometric analyzer 58, and program code 62 including a source and target model comparator 55 and specialized program code 64 that cooperates with server 16 to extract, generate, compare and display. Geometric analyzer 58 also includes comparison circuitry 53. Although not shown in FIG. 1 in order to simplify the drawings, it is understood that all of clients 14 are similarly constructed.

For purposes of this disclosure, the term "client" is understood to include a computer or a workstation, such as a personal computer provided within a client/server environment. A "client" is also intended to include any device present within an environment, such as a LAN environment provided by LAN 11, that includes an interface 24 for enabling a user to interact with client 14 and server 16 such that a user can be notified of important events via an interrupt interface 44. Even furthermore, "client" is intended to encompass the case of a stand-alone workstation, a computer, or a workstation that includes a server similar to server 16. It is further understood that a "client" can include other software components such as a database 36 and an operation manger 38, when constructed as a stand-alone workstation.

Also for purposes of this disclosure, the term "server" is understood to include one or more computers that are located at one or more physical locations within an environment, such as a LAN environment. Furthermore, for purposes of this disclosure, the term "server" is understood to include computers located at one or more physical locations, such as computers distributed about a network or a stand-alone workstation.

More particularly, server 16 includes a central processing unit (CPU) 32, memory 34, database 36, and operation manager 38. Within server 16, CPU 32 includes processing circuitry 46 that communicates with memory 34 in processing data 52 within a database 36 as well as handling program code 60 within operation manager 38. Database 36 includes one or more model files 48 for storing models 50 comprising data 52. Operation manager 38 comprises a production control module 54 including a staged translator 56 in which program code 60 is provided for forwarding one or more instruction sets to clients 14 to cause program code 64 to extract, generate, compare and/or display CAD models (or files).

With respect to client 14, user interface 24 includes an output device 40 which, in one form, comprises a user display 42 and interrupt interface 44. Geometric analyzer 58 includes program code 62, as described below in greater detail.

In order to implement computer aided design (CAD) file translation, geometric model comparator 10 utilizes geometric analyzer 58 to compare CAD files using point cloud extraction, as discussed below in greater detail. CAD file translation system 12 converts a first CAD file that is associated with a first CAD program into a second CAD file associated with a second CAD program. Geometric analyzer 58 then determines if a translated CAD file is "geometrically identical" to the original source CAD file from which it was translated. For purposes of this disclosure, the term "geometrically identical" is understood to mean geometrically substantially the same, within an acceptable predetermined geometric tolerance. In operation, geometric analyzer 58 implements point cloud analysis, including the identification and analysis of tessellated point cloud types, surface point cloud types, and edge point cloud types, as discussed below in greater detail.

More particularly, geometric analyzer 58 determines if a translated, target CAD model (or file) is geometrically identical to an original, source CAD model (or file). In order to make this determination, geometric analyzer 58 implements a comparison of surface and boundary edges for each respective file. Subsequently, a reverse point cloud analysis is then performed utilizing points that are extracted from the target (or output) file, which is then compared to the source (or input) file.

In summary, the implementation of point cloud extraction entails point cloud analysis which uses points that have been extracted from the source CAD model file. As will be discussed below in greater detail with reference to FIG. 4, these points lie either on the surfaces of an individual geometric feature, or they lie on one of the boundary edge curves. These extracted points are then recreated in the target CAD model file, after which distances between the points and the adjacent surfaces and edges are measured. Geometric analyzer 58 then implements point cloud analysis, following implementation of the point cloud extraction, in order to compare the surface and boundary edges of each respective file. It is understood that point cloud analysis of geometric analyzer 58 can be run as a stand-alone apparatus. Alternatively, point cloud analysis can be run as a CAD application that is implemented in accordance with proprietary software and an appropriate software license obtained from a respective CAD application developer.

For the case where a system 12 is implemented as a stand-alone apparatus or workstation, system 12 is not required to use proprietary CAD programs for performing analysis (as sold commercially). Therefore, such a stand-alone apparatus does not require the use of dedicated CAD workstations with proprietary CAD programs that incur relatively expensive royalties for using such proprietary CAD programs in order to perform analysis. Such a stand-alone CAD workstation has the capability to check points more rapidly because of the ability to optimize such a workstation for a specific purpose. In performing point cloud analysis, the distance between each point and an associated surface or edge is measured. Such measured distances are recognized as being acceptable when they fall within a relatively small (or minimal) threshold value, unless the surface in the output (or target) file has been incorrectly defined, in which case a user at interrupt interface 44 is notified of such a discrepancy.

In operation, geometric analyzer 58 of client 14 is configured to determine if a translated target geometric model file is geometrically identical to the original source geometric model file from which it was translated. In one case, source and target geometric model files each comprise respective CAD files. Geometric analyzer 58 is used to inspect such respective files by measuring the surfaces and boundary edges on all geometric features present in one CAD file, and then compare the respective surfaces and boundary edges to the corresponding surfaces and boundary edges in the other respective file. For example, the measured surfaces and boundary edges from a source geometric model file are compared with the measured surfaces and boundary edges of the respective target geometric model file.

More particularly, in one case geometric analyzer 58 performs a forward inspection by comparing surfaces and boundary edges in a source geometric model file with surfaces and boundary edges in a target geometric model file. Alternatively or additionally, a reverse inspection is performed by geometric analyzer 58 wherein surfaces and boundary edges of a target geometric model file are compared with surfaces and boundary edges of a source geometric model file.

Server 16 of FIG. 1 includes database 36 which is configured to store input data of a source model. Processing circuitry 46 is configured to convert the input data of the source model into corresponding output data of the target model. Geometric analyzer 58 includes a source and target model comparator that is configured to compare the input data with the corresponding output data to identify geometric discrepancies between the input data and the output data.

Geometric analyzer 58 enables measurement of such surfaces and boundary edges, then facilitates the reporting of measured and compared results to an operator at a user interface 24 of client 14. Geometric analyzer 58 implements point cloud analysis in order to perform measurements between the surfaces and boundary edge curves of the source model and the target model. More particularly, geometric analyzer 58 uses points that were previously extracted from the source model file. Such points either lie on the surfaces of the individual geometric features of a model, or such points lie on one of the boundary edge curves of the model. The respective points are then recreated in the target model file, after which distance is measured between each point and respective adjacent surfaces and edges.

In order to increase the probability that the existence of any differences between the source model files and the target model files will be detected, the above process is also implemented in reverse. Accordingly, geometric analyzer 58 extracts points from the target model file, then recreates the points in the source model file. Afterwards, geometric analyzer 58 measures distances between the points and their appropriate surface or boundary edge curve of the target model file and the source model file.

It is understood that point cloud analysis can either be performed using a source CAD system and a target CAD system, or point cloud analysis can be performed using a stand-alone system, such as a workstation, that has been developed specifically as a stand-alone computational geometry system. Such a stand-alone implementation provides an advantage in that special purpose construction can make it relatively faster, thereby enabling a larger number of points to be analyzed within a given amount of time. Such result increases the probability of detecting geometric discrepancies. Additionally, a stand-alone implementation does not require the use of a software license from either a source CAD system provider or a target CAD system provider in order to perform analysis. Accordingly, an improved utilization of resources is provided in that there exists a diminished need to provide for software licensing of source CAD system software or target CAD system software when using a stand-alone conversion system.

Figure 2:
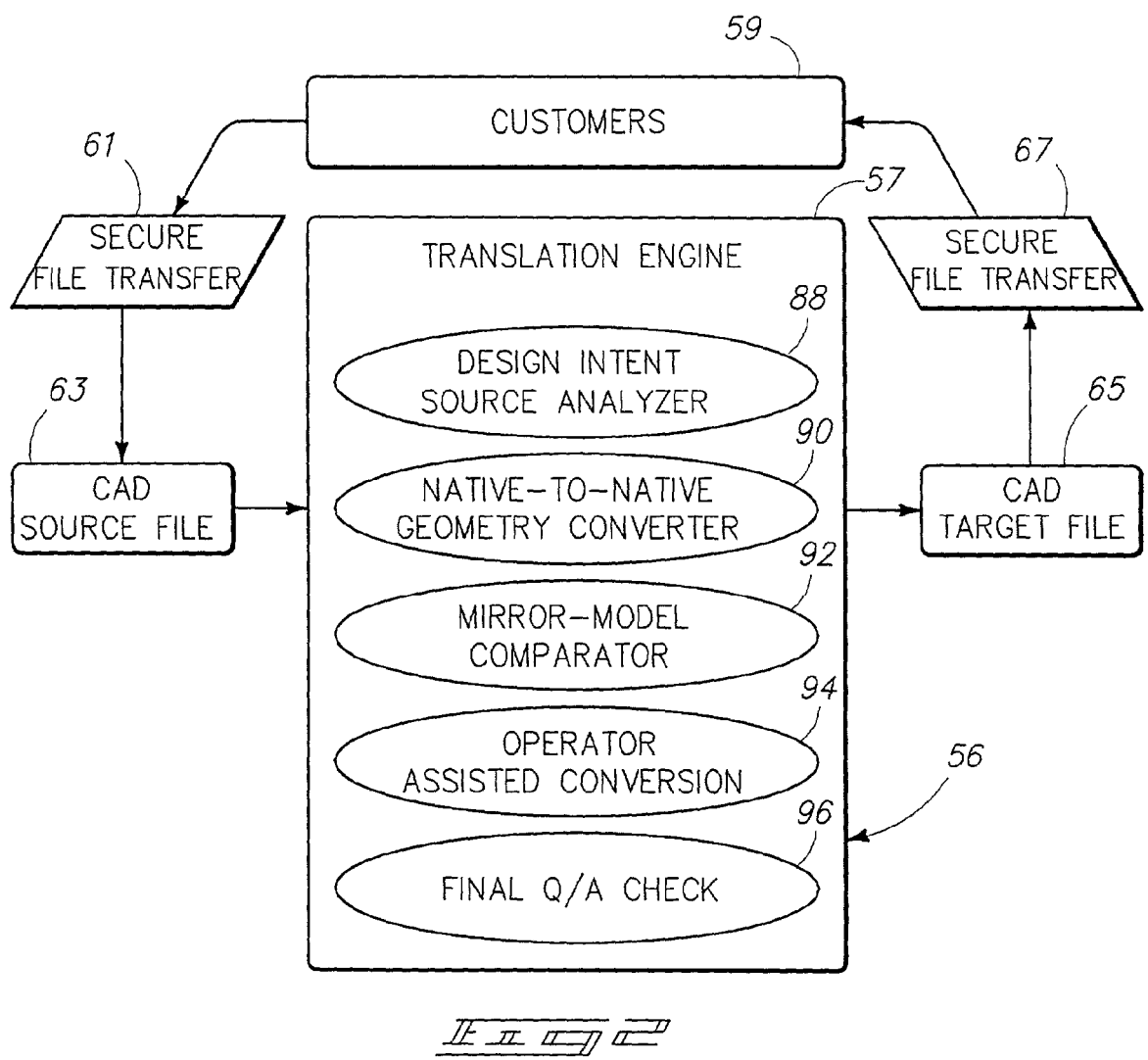
FIG. 2 is a block diagram of a representative geometric data comparison implementation performed via a translation engine of a computational geometry system according to the present invention.

FIG. 2 illustrates the translation process between a source CAD file and a target CAD file utilizing the computer aided design file translation system of FIG. 1. More particularly, translation engine 57 of staged translator 56 (see FIG. 1) receives a source CAD file 63 by way of a secure file transfer 61 from a customer 59. Translation engine 57, by way of a process implemented for the computer aided design file translation system of the present invention, converts source CAD file 63 into a target CAD file 65. The target CAD file 65 is then transferred via a secure file transfer 67 back to customer 59. One technique for implementing the secure file transfer 61 and 67 entails utilizing secure file transfer over the Internet by uploading and downloading files securely over the Internet via one or more secure servers.

Upon uploading a source CAD file 63 to a translation provider's web site, a job description profile is preferably generated. File 63 is then passed to a pre-processing station, configured as a design intent source analyzer 88, which performs design intent analysis, and identifies any pre-processing tasks that are required in order to prepare the file for a translation production line.

Subsequent to processing, resulting file geometry data is then converted into a target CAD file format utilizing native-to-native geometry converter 90. After such conversion, the target CAD model file is compared to the source CAD model file using a mirror-model comparator 92. Any discrepancies found as a result of source-target file comparison are then conveyed to a human translator in the form of a text report and a visual display that is provided in the target CAD model. The target CAD file is then modified via an operator-assisted conversion process 94 in order to eliminate any discrepancies. The file is then re-compared to the source CAD model as a final quality assurance (QA) 96, and is then sent back to the customer via the Internet.

Figure 3:
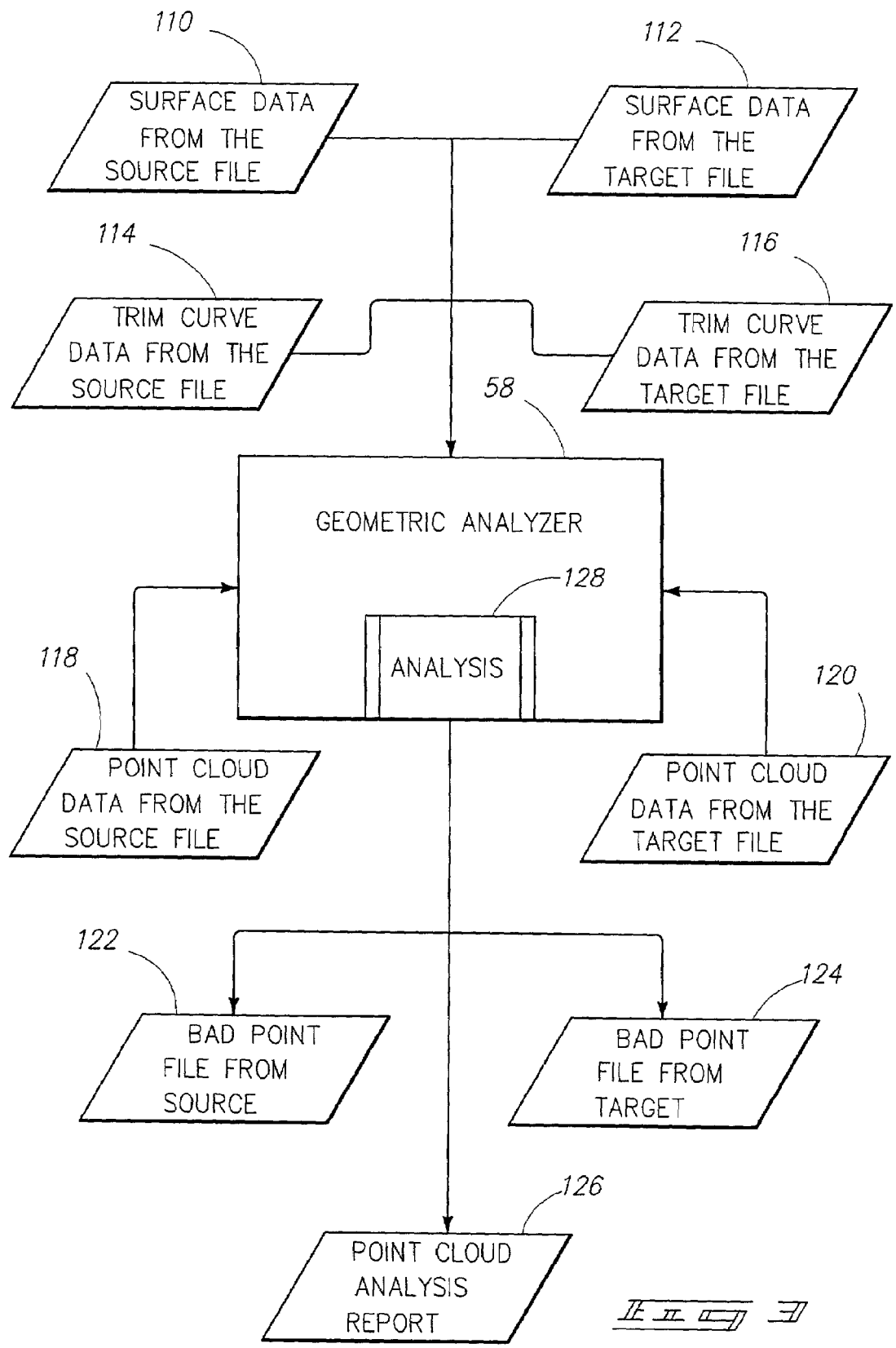
FIG. 3 illustrates data input to a geometric analyzer and respective output in the form of files from the geometric analyzer for a stand-alone workstation embodiment.

As shown in FIG. 3, all of the surfaces and associated trim curves are required to be extracted from both the source CAD model file and the target CAD model file, after which the extracted associated trim curves are stored in geometric analyzer 58 (of FIG. 1). More particularly, surface data 110 from the source file and surface data 112 from the target file, along with trim curve 114 from the source file and trim curve data 116 from the target file, are input into geometric analyzer 58. Source point cloud data 118 is then analyzed against target surface/trim curve data 110, 114, and target point cloud data 120 is analyzed against source surface/trim data 112, 116, as shown in FIG. 3. Bad point cloud files 122, 124 are then imported into respective CAD model files in order to display them to an operator or user, typically via interrupt interface 44 of client 14 (of FIG. 1). Utilizing the CAD software's internal geometry analysis tools, an operator can measure the distance from each individual point to an associated edge or curve in order to ascertain the magnitude and cause of a deviation. Furthermore, an analysis algorithm 128 of geometric analyzer 58 generates a point cloud analysis report 126.

In order to implement point cloud extraction, geometric analyzer 58 (of FIGS. 1 and 3) performs three different types of point cloud analysis: tessellated point cloud analysis; surface point cloud analysis; and edge point cloud analysis. A description of each of these different types of point cloud analysis is described below with reference to FIGS. 4–7.

Operation manager 38 includes a native-to-native geometry conversion system within program code 60. When such system translates a CAD model file, each geometric feature is scrutinized using translator software within staged translator 56; namely, via program code 60. The translator software is operative to extract point cloud data by forwarding an instruction set to clients 14 that cooperates with program code 64 for directing extraction of point cloud data. In order to assure that points are extracted accurately, the distance between points and their corresponding associative entities (surfaces and curves) in the source model file are measured using extraction software within program code 64. All points that do not lie directly on a surface or an edge curve are then deleted. This step is necessary in order to protect against algorithmic errors that are potentially present in CAD system software. Remaining points are then stored in a file which is labeled according to type: tessellated; surface; or edge. In a similar manner, when a file translation has been completed, point cloud data is extracted from the target file and is then stored in memory 22.

System 12 implements point cloud analysis by way of geometric analyzer 58. When a user or operator of client 14 runs geometric analyzer 58, appropriate point cloud files are read by geometric analyzer 58. Such implementation occurs whether system 12 is implemented across a client server network environment or via a stand-alone workstation. The points are then compared against their corresponding entities by measuring the distance between each respective point and the nearest edge or surface that is present in the other CAD file. Points which have been extracted from the source are then measured in the target file, and points extracted from the target are measured in the source file. Surface points are then measured distance-wise against surfaces, and edge points are measured against edge curves.

If it is found that the distance between each individual point and its associated entity is less than a specific predetermined tolerance value that is required for a geometric feature, then the point is deleted from the model file. For example, the distance between a point and an edge curve in a source file is compared with the distance between the respective point and the respective edge curve in a target file. If the difference between such measured values deviates more than 0.05 mm (a specific predetermined tolerance value based upon a unit of measure), then the point is not deleted from the model file because it is found to be outside the tolerance range.

When geometric analyzer 58 has measured all of the points in the point cloud file(s), the points that are left over in the model file are points that do not lie directly on (or within a tolerance range) of any surface or edge. Such points represent differences in the geometry between the two files. The coordinates of these points are then saved in a separate file that is appropriately labeled "Bad Point File". Where a forward check is performed, a bad point file is created from the source. Where a reverse check is performed, a bad point file is created from the target. The distance from this point to the associated curve or surface comprises the magnitude of the deviation in geometry at that specific point in space.

Figure 4:
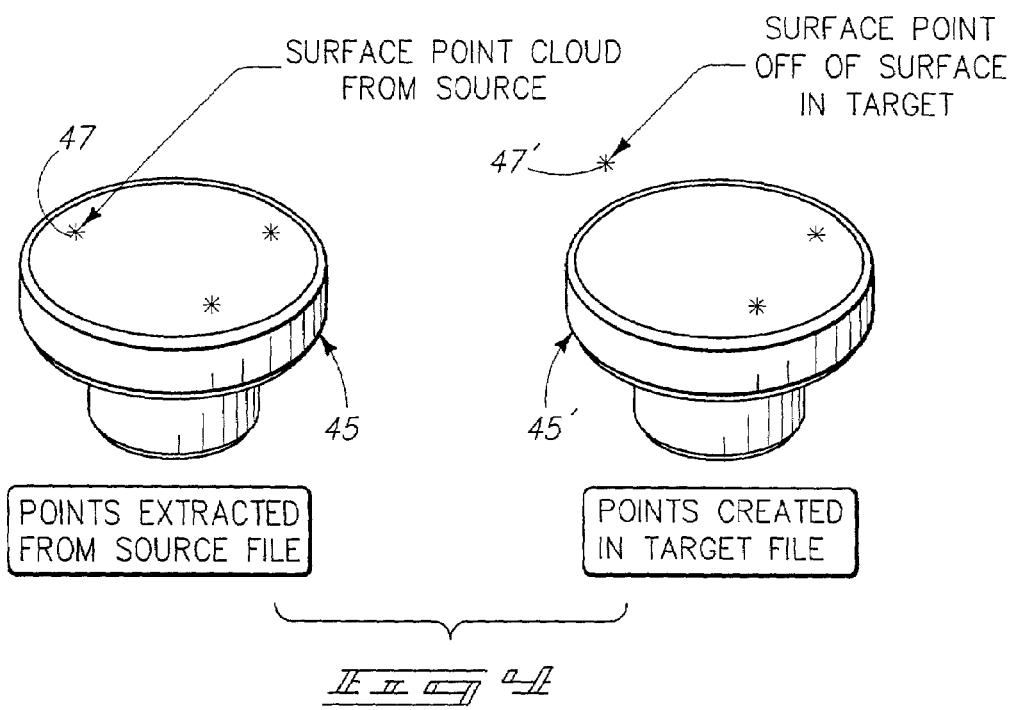
FIG. 4 is a perspective view illustrating extraction of point cloud data from a source model which is recreated in a target model wherein distances between respective points and a corresponding surface are measured.

FIG. 4 illustrates point cloud data that is extracted from a source model 45 and recreated in a target model 45'. The distance between respective points 47 and 47' on the corresponding surface is then measured. The resulting deviation from point 47 to the associated curve or surface (of source model 45 and target model 45') is the magnitude of the deviation geometry at that specific point in space.

Geometric analyzer 58 also identifies different point cloud types. Each of the three previously identified types of point cloud data is extracted separately utilizing a CAD file translation engine provided by staged translator 56; namely, via program code 60 which sends instructions to clients 14. Each type of point cloud data is described below in greater detail. Geometric analyzer 58 uses each point cloud type in order to maximize the advantages of each, while minimizing relative disadvantages. Geometric analyzer 58 uses a tessellated point cloud type in order to quickly find missing features and gross differences in relative geometry. Surface point cloud types are used to very accurately determine differences between surfaces, as well as to verify the dimensional integrity of features. Edge point cloud types are used to verify boundary accuracy and can provide detailed correction information to an operator.

TABLE 1

A Comparison of Point cloud Types

| Type | Advantages | Disadvantages |
|---|---|---|
| Tessellated | Automatically increases point density for areas of high curvature<br>Quickly finds missing features<br>Quickly finds gross geometry errors/differences | May detect differences on boundary edges<br>Difficult to create correcting geometry from these points (need edge points to build boundaries)<br>Can miss subtle geometry errors/differences |
| Surface | Very accurate for surface error detection<br>Quickest analysis to perform<br>Detects surface differences between the boundary curves | May not detect differences on boundary edges<br>Difficult to create correcting geometry from these points (need edge points to build boundaries) |
| Edge | Detects boundary curve differences<br>Facilitates correction geometry creation (especially if used with surface Point cloud) | Longer analysis time<br>Does not detect differences on surfaces between the edge curves |

Tessellated Point Cloud

Figure 5:
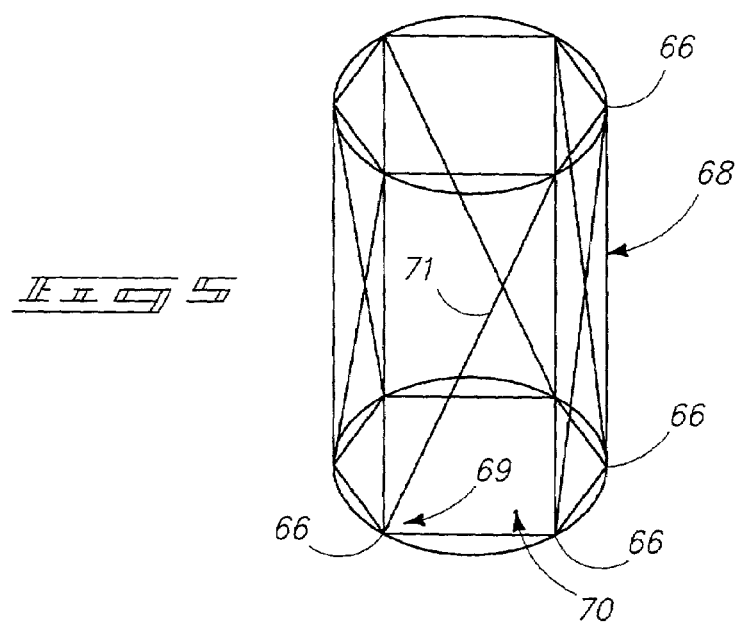
FIG. 5 illustrates an approximation of a cylindrical surface showing respective tessellation triangles when tessellating an exemplary curved, cylindrical surface.

Referring to FIG. 5, tessellation comprises the process of generating flat triangles 70 that approximate a curved surface of a modeled object. This process typically involves the creation of a series of points 66 that lie on a surface 68. Subsequent to generating points 66, points 66 are joined into a mesh of triangles 70. Accordingly, the vertices 69 of the triangles 70 lie on surface 68, whereas the edges 71 of the triangles may deviate from the surface.

The density of points 66 on cylindrical surface 68, the spatial distribution of points 66, and the number of triangles 70 that are created are often controlled using two parameters: first, chord length; and secondly, angle deviation. These parameters are best described below using the example of a tessellated curve (see FIG. 6).

Figure 6:
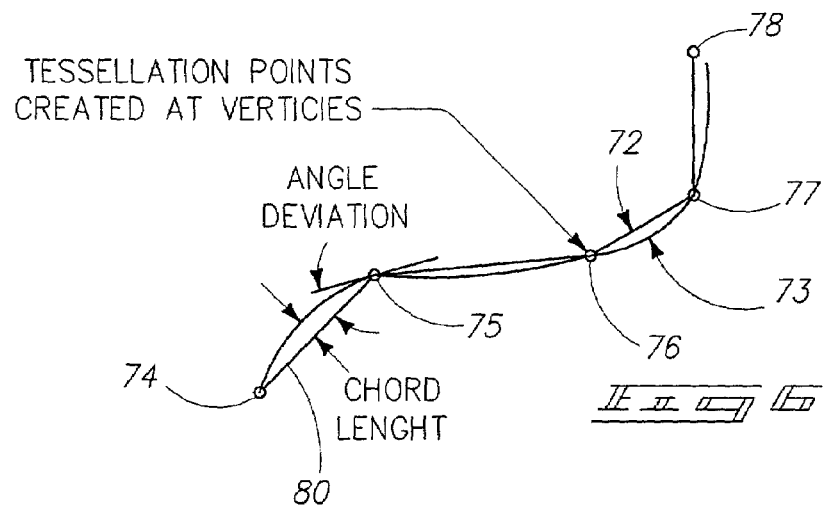
FIG. 6 illustrates an exemplary tessellated curve with tessellation points, or point cloud data.

In FIG. 6, a tessellated curve 72 for a boundary curve 73 of a geometric model is shown with a plurality of tessellation points 74–78. As shown, chord length is the maximum distance allowed between a particular line segment 80 and boundary curve 73. The angle deviation (or angle control) defines a maximum allowed angular deviation of the edges of the triangles from a tangent to the curve at the vertex. More particularly, as the curvature of the edge curve becomes greater, the individual line segments that make up a tessellated surface will inherently become smaller. This is necessary in order to maintain the specified chord length and angle deviation. Accordingly, this automatically increases the number of points generated in regions of high curvature. Similar to tessellated curves, tessellated surfaces are still controlled by a chord height, and angular control. Chord height is the largest distance that any given triangular surface is allowed to deviate from a surface being approximated. As a result, the "point cloud" used to create the vertices of all of the triangular surfaces automatically becomes denser in areas of relatively high curvature.

Most presently commercially available CAD software is provided with a tessellation function built therein. For example, Pro/E includes such a tessellation function. In many cases, these tessellation functions can simply be called upon to create points at all of the vertices of a triangular surface in order to generate a tessellated point cloud. However, the process of locating or finding points (triangle vertices) on surfaces often involves mathematical techniques with built-in tolerances. As a result, these tolerances sometimes lead to the creation of tessellated points that fall outside of the desired surface. A tessellated point extractor, configured to extract tessellation point, provided within geometric analyzer 58 analyzes all the points which are created using the tessellation engine of the CAD system, and automatically rejects all points that are not provided exactly on the surface of the model.

Surface Point Cloud

Figure 7:
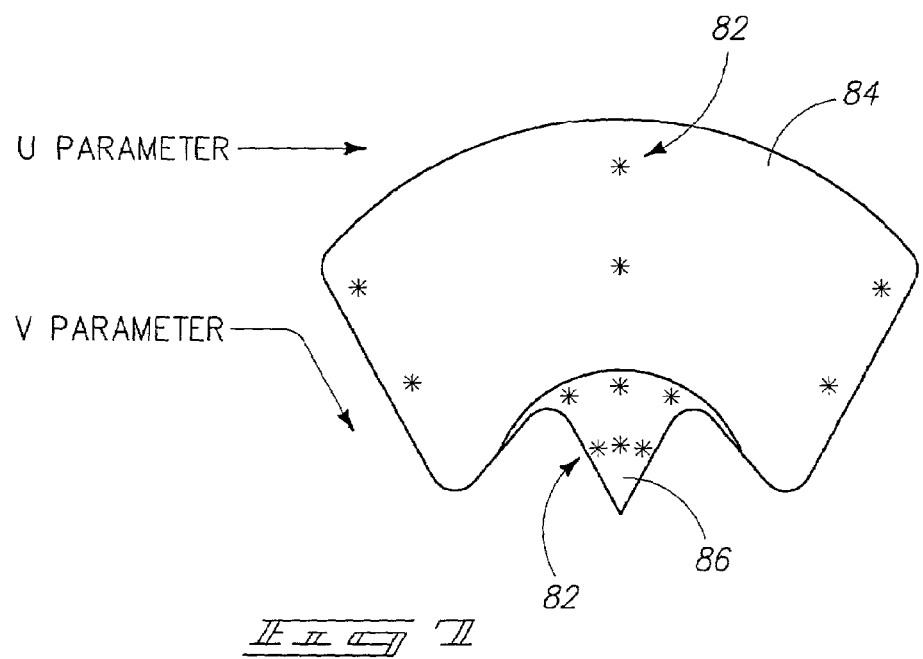
FIG. 7 illustrates an exemplary geometric model having a matrix of points created along a 3×4 surface, showing a 3×4 surface point cloud matrix.

As shown in FIG. 7, surface point cloud data is extracted by stepping along each individual surface in a U parameter direction and a V parameter direction, creating points at predetermined parameter intervals. Such a method creates a matrix of points 82 along a surface, such as surfaces 84 and 86. For example, surface points 82 are shown evenly distributed about each of surfaces 84 and 86 of an object in FIG. 7.

Edge Point Cloud

Although not shown in a specific figure, by stepping along the boundary edges of each face of a solid (such as the faces of a solid shown in FIG. 7) and creating evenly dispersed points that lie on the edge, edge point cloud data can be generated. The respective faces of a solid, by way of example, can comprise trimmed surfaces that form a bounding surface for the volume of the solid. The edge surfaces are typically parametric curves. The resulting evenly dispersed points are generated by stepping along the curve parameter using a predetermined parameter interval.

Point Cloud Analysis

Once all the point cloud data has been generated with geometric analyzer 58 using the above-described techniques, three-dimensional coordinates for the resulting point cloud data are stored in files according to type. By using presently available programming interface functions of each respective CAD software, these points are created in an appropriate CAD model file. For example, API functions are available for use. The tessellated and surface point clouds are then analyzed by measuring the distance from each individual point to the nearest surface. Edge point clouds are measured to the nearest edge curve. If the resulting distance is equal to zero, or is smaller than a tolerance that has been previously specified in geometric analyzer 58, then the point is deleted from the model. Any points remaining in the model file after analysis is complete are then classified as geometry errors and their coordinates are stored in a separate geometry error file such as bad point files 122 and 124 of FIG. 3.

Because the most common type of surface encountered is a surface that is bounded by three or more edges, the number of edge points and the number of edges in a model can quickly become very large. In order to determine which edge provides a nearest edge, geometric analyzer 58 is required to measure the distance from each edge point to each edge within a given model. In models having relatively large numbers of surfaces, edges and points, this analysis can be relatively intensive and time consuming.

Accordingly, in order to speed up edge analysis, the number of edges required to be analyzed against a given point is reduced by measuring only to those edges in which a pre-sized bounding box contains the point being analyzed. More particularly, a bounding box is provided having a dimensional tolerance value in which the bounding box is the smallest three-dimensional box that can contain the entire edge curve.

Accordingly, the above techniques greatly reduce the number of times that the analyzer is required to measure the distance from a given point to a given edge within a model.

Point Cloud Analysis (Stand-Alone Analyzer)

According to an alternative construction where system 12 is implemented within a stand-alone workstation, system modifications are made in order to speed up analysis. In the past, the use of a CAD system's internal tools to measure distances from points to curves and surfaces has typically been a relatively slow process. A slow process results because the analysis tends to be subject to the speed limitations of the CAD software itself. The CAD software is typically busy doing several other operations; for example, one operation entails displaying a complex image to an operator. Accordingly, relatively slow operating speed can result from speed limitations and other operations.

For the case of a stand-alone workstation version of system 12 (and geometric analyzer 58), increases in speed of analysis are implemented by modifying the implementation procedure. Accordingly, point cloud densities can be increased, which in turn improves the accuracy of analysis.

In the case of a stand-alone workstation (and stand-alone geometric analyzer), the same analysis is implemented as was performed for an internal CAD system construction as above described. However, there is a difference in that the surfaces of all the geometric features from the source model and the target model must be extracted for use by the analyzer. The geometric analyzer does not have to display any imagery to the operator, nor does it have to perform any other CAD related functions. Therefore, the geometric analyzer can be optimized for efficient measurement.

The extraction of surfaces from the source CAD system and the target CAD system is done by extracting NURBS surfaces (as discussed below), and their associated trim curves.

Design Intent Source Analysis

With reference to design intent source analyzer 88 (of FIG. 2), there are three purposes for design intent source analysis: First, design intent source analysis is performed to evaluate the "manufacturing design intent" of the source CAD file to assist in the feature mapping between the source and target CAD systems. Secondly, design intent source analysis is performed to provide process mapping and routing details to the translation production line. Finally, design intent source analysis is performed to predict the cost of the translations and to convey a quotation back to a customer that has requested translation services.

Design intent is conveyed and interpreted by evaluating the methods used to define the geometry in the source file, and determining which methods a designer would use in order to create the same geometry in the target CAD system. A method of creating a specific feature may be perfectly natural to a designer using a source CAD application. However, that method may be very unnatural to a designer using the target CAD system. After performing design intent analysis, such methods are identified, and a natural method mapping can occur.

For example, in Pro/E a designer would create a hole by inputting the hole command, specifying the location of the hole, and the size (or dimensional) parameters of the hole, as shown in FIG. 8. FIG. 8A illustrates a model of a solid cube comprising solid base material. FIG. 8B illustrates a hole which has been inserted on a face of the cube by a Pro/E designer who has created a hole in the solid material of the cube by specifying the surface and location for the hole, and the hole dimensional parameters. In contrast, FIGS. 9A–D illustrate how a CATIA designer would create a hole by creating a solid cylinder having a desired dimension, locating the cylinder and orienting it relative to the solid cube in which it is desired to put a hole, and then subtracting the solid cylinder from the base solid cube material. Accordingly, the same function in CATIA is accomplished by creating a solid cylinder, locating and orienting the cylinder relative to the cube model, and subtracting the solid cylinder from the remainder of the cube model. FIG. 9A illustrates the cube comprising a solid base material. FIG. 9B illustrates creation of the solid cylinder. FIG. 9C illustrates a cylinder, located and oriented in a desired configuration. FIG. 9D shows the cylinder after it has been subtracted from the base, or cube. Table 2, below, illustrates in summary a natural method mapping for a Pro/E CAD file feature as well as a CATIA CAD file feature map.

TABLE 2

Natural Method Mapping

| Pro/E CAD File Feature | CATIA CAD File Feature Map |
|---|---|
| Hole | Sol. Cyl → Locate & Orient → Subtract Sol. Cyl from Base solid |

It is probable that some of the geometric features created by the source CAD application are created in such a manner that the target CAD application cannot create the same geometry using the same method of creating it. One reason this happens is because the specific feature functions that were used in the source system do not exist in the target system. Another reason is due to approximation algorithms. Most CAD systems approximate complex geometry using proprietary algorithms. It is very unlikely that two CAD systems will use the same algorithms to approximate the same geometric features. Therefore, differences in the geometry are bound to occur even though the feature in the target file was created using the same methodology as the feature in the source file. Regardless of the cause of any inaccuracy, the solution is the same: A set of features needs to be found in the target CAD system that duplicates the geometry found in the source file. This requires mapping of feature geometry methods to the target CAD system.

In order to accurately predict the cost of converting a CAD model file, there are four pieces of information necessary. First, the size of the file; secondly, the number of geometric features that need to be converted; thirdly, the type of features; and finally, source and target CAD file applications. The source design intent analyzer performs a series of scans on the source file in order to determine this information. First, It counts the number of features in the source model file and parses them into specific feature type categories. Then, the features are classified into categories of a) geometry that always automatically converts over every time; b) geometry that automatically converts over X% of the time; and c) geometry that never automatically converts over and requires operator assistance to complete it. This classification will be specific to the particular source and target CAD systems. Once the features in the source model file are categorized and counted, then simple algorithms can be used to predict the conversion cost.

Native-to-Native Geometry Conversion

According to the present translation engine implementation, the approach to CAD file conversion is based upon the assumption that a purely automated software solution is not possible. Existing technical barriers are numerous, which prohibits a purely automated software solution. Therefore, a technology is needed that integrates the automatic recreation of geometry in the target CAD system.

There are two major steps to the native-to-native geometry conversion process of converter 90 (see FIG. 2). First, there is a source to Applicant's model format (an intermediate format) conversion. Secondly, there is Applicant's model to target file conversion.

Both of these steps are accomplished by utilizing the CAD system's own application program interfaces (API's). The source CAD system's own function calls are then used to extract a list of the geometric features that make up the source model file. These features and their defining parametric data are stored in a series of Applicant's proprietary data formats. The formats are described in the algorithm section below. Utilizing the equivalent function calls for the target CAD system, the geometric features are recreated by reading the geometric feature data from the Applicant's model formats. This provides a "hub and spoke" type of configuration in which once a CAD system is implemented to write to and read from the Applicant's model formats, it is then possible to convert file to or from any other CAD system that is implemented.

In order to facilitate the process of converting from a source file format to Applicant's formats and from Applicant's formats to a target file format, several CAD system specific utilities were developed. These utilities perform specific tasks including but not limited to: extracting mathematical geometric data from the source model file and storing it in Applicant's proprietary format, mapping certain geometry generation function calls from Applicant's formats to the appropriate target CAD system function calls, and determining specific geometric data that is not necessarily provided by the source CAD system, but will be needed in order to generate the equivalent geometry with the target CAD system.

Geometric Model Comparison

Geometric model (or mirror-model) comparison is the process of comparing the source CAD file with the target CAD file to determine if discrepancies exist. The comparison consists of measuring the distances between the corresponding surfaces and boundary edges of the two files. If the target file is a perfect duplicate of the source file, then all of these measurements will yield zero distances.

The process invokes Applicant's point cloud data (or Pixie Dust) analysis process, which creates a series of points that lie on the surfaces and edge curves of each geometric feature of a model. These points are then brought into the target CAD model file and the distance from the points to the corresponding surfaces and curves are measured. Any points that lie on the appropriate surface or edge curve, or within acceptable tolerances, are deleted from the target model. The points that lie outside of the acceptable tolerances are flagged as errors in the model file.

The reverse of this process, where points are extracted from the target model file and are inserted into the source file can also be invoked. This increases the probability of finding all of the discrepancies between the two files and reduces the probability of an error going undetected.

There are three general types of point cloud points generated, which include tessellated points, surface points, and edge points. Tessellated point cloud points use a tessellation routing to determine a series of vertices that are scattered all about a surface.

An operator can then select which type of point cloud analysis to run. The advantages and disadvantages of these three types were described above in Table 1.

The translation production line concept is a process that treats CAD file conversion as a manufactured product. The process applies manufacturing production line techniques to the process of converting CAD file formats.

Figure 10:
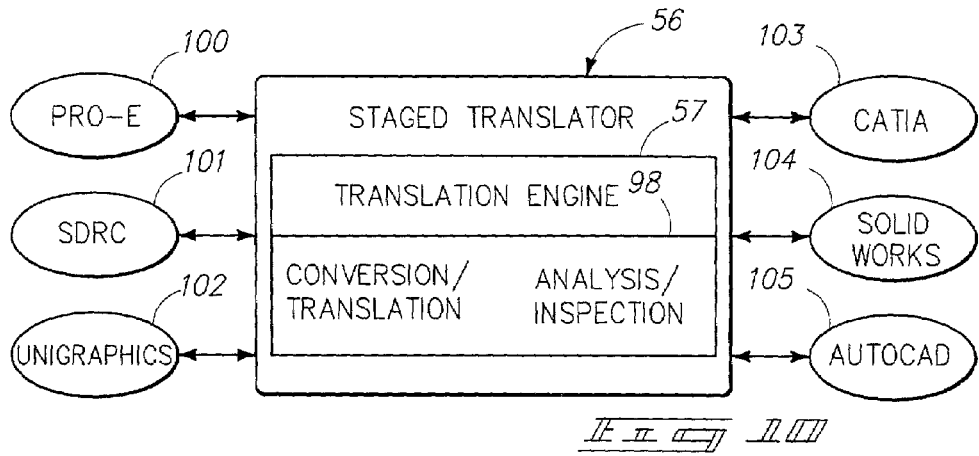
FIG. 10 is a block diagram illustrating the functional relationship of a staged translator having a translation engine for comparing source geometric data in a source geometric model of a first type with target geometric data of a target geometric model of a second type.

As shown in FIG. 10, staged translator 56 includes a translation engine 57. Translation engine 57 implements conversion/translation and analysis/inspection when converting from a source CAD model (or file) (or a CAD file that a customer wishes to convert from) to a target CAD model (or file) (or a CAD file that a customer wishes to convert to). For example, various different source CAD files and target CAD files are shown in FIG. 10. For example, a Pro/E CAD file 100, an SDRC CAD file 101, and a Unigraphics CAD file 102 each comprise source CAD files; whereas, a CATIA CAD file 103, a SolidWorks CAD file 104, and an AutoCAD file 105 each comprise target CAD files.

The translator implementation of FIG. 10 enables a relatively efficient quotation process when the system of the present invention is used to implement staged translation for a third party desiring translation of drawings from a source CAD file into a target CAD file. Such a process entails: reviewing source CAD model geometric features using feature statistics; implementing design intent analysis and feature parsing; and estimating conversion costs based upon the number of features, and the types of features identified.

Figure 11:
FIG. 11 illustrates mapping of a regeneration process when reordering a Boolean tree.
Figure 12:
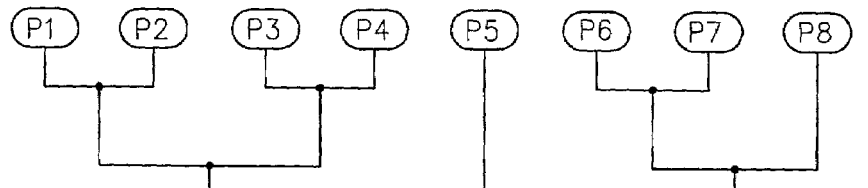
FIG. 12 illustrates an exemplary Boolean-based CSG tree.

FIG. 11 illustrates the mapping of a regeneration process comprising the reordering of a Boolean tree. FIG. 11 illustrates a feature based Boolean tree. FIG. 12 illustrates a respective Boolean based CSG tree. By mapping the regeneration process using the feature based tree of FIG. 11 and the Boolean based CSG tree of FIG. 12, the manner in which errors can be easily and serially displayed to a technician in a serial manner and in a target CAD file are readily apparent. A technician can complete features that the software cannot properly complete (as identified by an interrupt interface). Furthermore, the technician can additionally or alternatively repair any errors that exist within the geometry as identified by the system.

Overall Implementation

In order to implement the computerized design model (or file) translation system features of the present invention, the following methodology is carried out. In Stage 1, a source model file design intent analysis is performed. Subsequently, a Stage 2 analysis generates a duplicate target model file corresponding with the source model file with the pre-existing, source model file. In Stage 3, a geometric model comparator analysis is implemented by way of a forward check, a backward check, or a forward and backward check. Finally, a Stage 4 operation entails an operator inspecting the resulting analysis file and correcting any errors that are detected, and then rerunning the analysis of Stage 3 by way of a geometric model (or mirror-model) comparator.

According to Stage 1, source model file design intent analysis entails receiving a pre-existing, or source model file, then storing the model file in memory. Subsequently, the pre-existing, source model file is opened using a source CAD system. Next, the pre-existing, source model file architecture is evaluated, and the model file is exploded. Subsequently, construction history indicating how the model was originally graphically built is then examined. Furthermore, comparison reference data (or point cloud data) is then extracted. Finally, the extracted data is stored in a designated metafile format (an intermediate file format).

In Stage 2, the methodology includes launching a target CAD system. Subsequently, a target model file is recreated, duplicating the same process that was used to create the original pre-existing, source model file. Interrupts are subsequently generated, when necessary, indicating to an operator that help is needed in recreating the target model file. For example, an interrupt can be displayed on a user display screen to a user indicating "I need help". Finally, Stage 2 entails an operator "clearing" any interrupts (or removing and fixing the cause) that are presented to the user or operator during recreation of the target model file.

In Stage 3, the methodology entails a forward check and a backward check. In the forward check, points are created in the target CAD file representing the location of edges, and surfaces of the source model. Distance is then measured between the points and the edges/surfaces. Subsequently, points are deleted that fall within a predetermined tolerance. The forward check is finally completed by saving a model file containing "bad" points, or points that fall outside the predetermined tolerance. The backward check is implemented in the same manner as the forward check, except point cloud data is extracted first from the target model, then compared with point cloud data extracted from the source model. A forward and backward check entails performing both checks, then saving "bad" points from both check into a common file.

Stage 4 of the methodology includes an operator inspecting the analysis file resulting from the previous stages. Next, distances are measured between points and edges/surfaces. Subsequently, points that deviate, or fall outside a predetermined value are identified and a determination is made as to whether corrective action is required on the part of the operator. If corrective action is required, the operator then corrects any errors in the analysis file. Finally, the operator reruns the analysis, starting again with Stage 3 in order to determine whether the corrective action has remedied the problem with respect to the geometric data which is requiring corrective action to fall within the predetermined tolerance.

Figure 13:
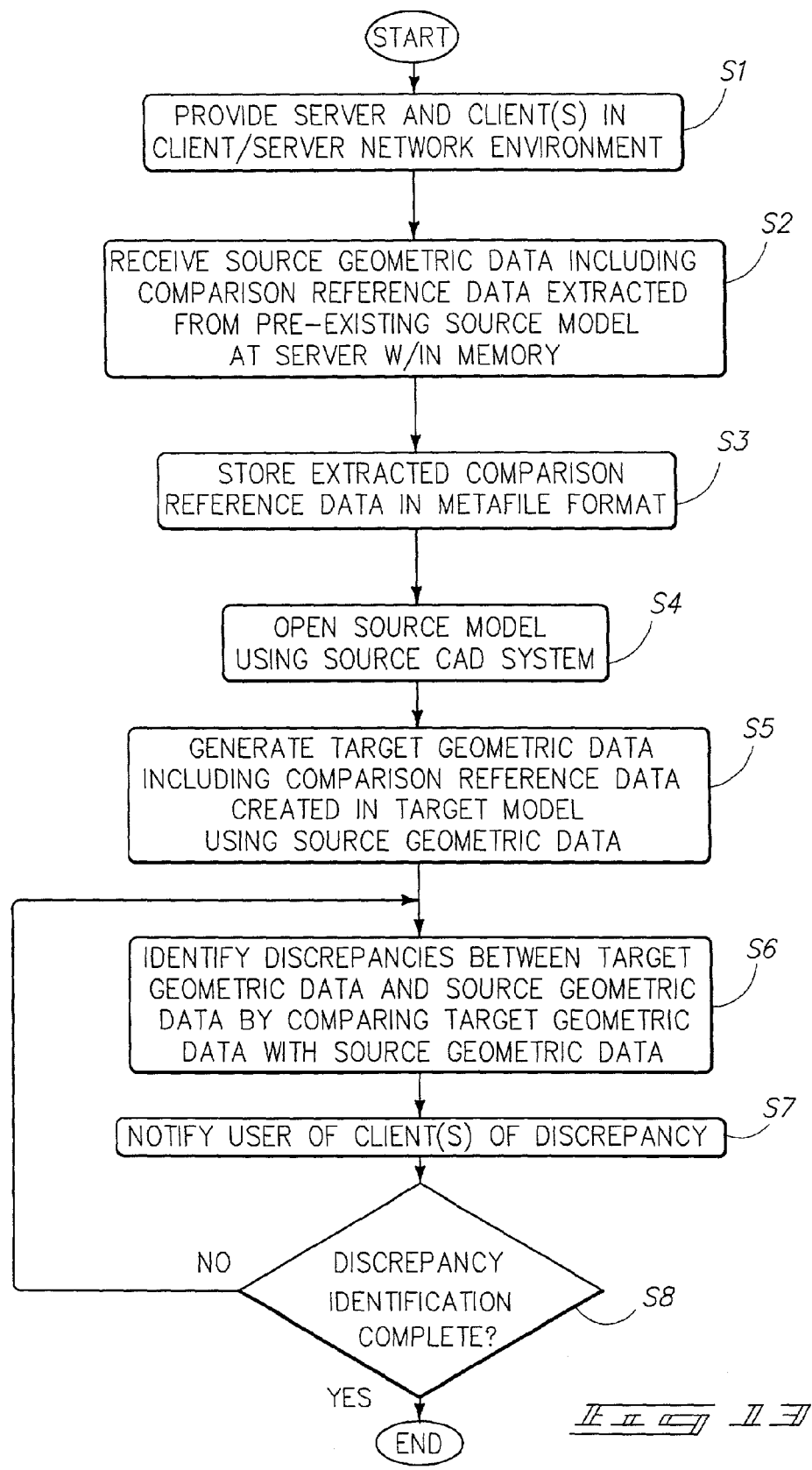
FIG. 13 is a process flow diagram showing the logic processing for managing computational geometry translations by way of the geometric model comparator.

FIG. 13 illustrates by way of example one method for managing computational geometry system translations by way of a geometric model comparator that utilizes point cloud features as well as a forward check, a backward check, and/or forward-backward check. In this manner, selected points can be identified from a source model (or file) and corresponding selected points can be generated in a target model (or file). The selected points are compared from the source model with the selected points from the target model in order to identify one or more selected points from the target model that fall outside of a predetermined tolerance range with respect to one or more points from the source model. A geometric model comparator compares the input data with corresponding output data and identifies any geometric discrepancies between the input data and the output data.

As shown in FIG. 13, a logic flow diagram illustrates the steps of implementing such a geometric model comparator.

In Step "S1", a server and at least one client are provided within a client/server network environment. After performing Step "S1", the process proceeds to Step "S2".

In Step "S2", the system receives source geometric data including comparison reference data extracted from a pre-existing source model at the server within memory. After performing Step "S2", the process proceeds to Step "S3".

In Step "S3", the system stores the extracted comparison reference data within a meta file format utilized by Applicant's system. After performing Step "S3", the process proceeds to Step "S4".

In Step "S4", the process proceeds by opening the source model using a source CAD system, such as CATIA. After performing Step "S4", the process proceeds to Step "S5".

In Step "S5", the process proceeds by generating target geometric data including comparison and reference data created in a target model using the source geometric data. After performing Step "S5", the process proceeds to Step "S6".

In Step "S6", the process identifies discrepancies between the target geometric data and the source geometric data by comparing the target geometric data with the source geometric data. After performing Step "S6", the process proceeds to Step "S7".

In Step "S7", the process and system notify a user or operator at the client of the presence of the discrepancy. After performing Step "S7", the process proceeds to Step "S8".

In Step "S8", a query is made as to whether the operation of identifying discrepancies is complete. If the process is not complete, the process returns back to Step "S6". If the process is determined to be complete, the process is terminated.

Figure 14:
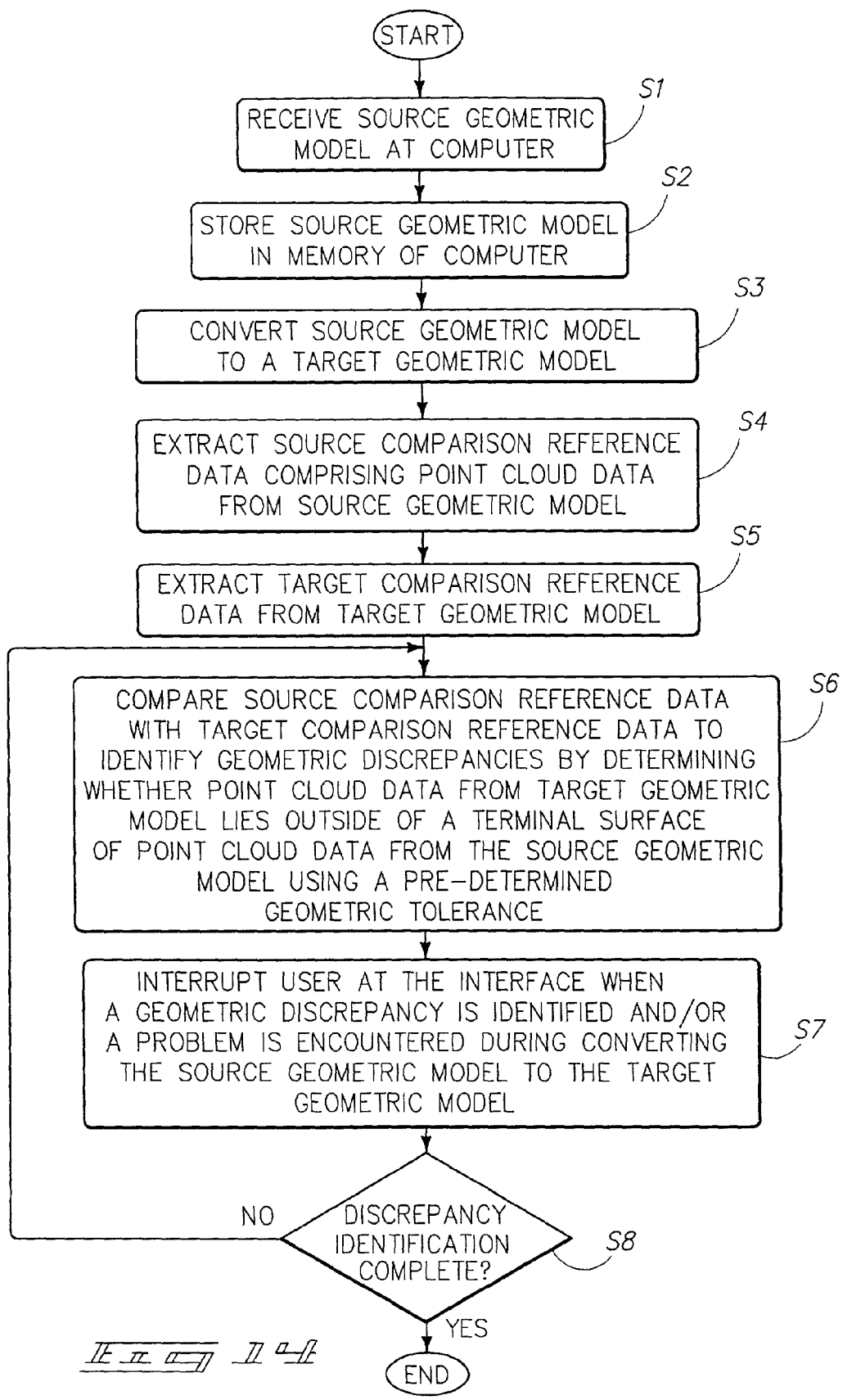
FIG. 14 is a process flow diagram showing the logic processing for implementing a geometric file conversion on a computer system having an interface.

FIG. 14 illustrates by way of another example a machine-executed method for implementing a geometric file conversion on a computer system including an interface. In Step "S1", a source geometric model is received at a computer. After performing Step "S1", the process proceeds to Step "S2".

In Step "S2", the source geometric model is stored in memory of the computer. After performing Step "S2", the process proceeds to Step "S3".

In Step "S3", the source geometric model is converted into a target geometric model. After performing Step "S3", the process proceeds to Step "S4".

In Step "S4", the source comparison reference data is extracted from the source geometric model, wherein the source comparison reference data comprises point cloud data. After performing Step "S4", the process proceeds to Step "S5".

In Step "S5", target comparison reference data is extracted from the target geometric model. After performing Step "S5", the process proceeds to Step "S6".

In Step "S6", the source comparison reference data is compared with target comparison reference data in order to identify geometric discrepancies. The comparison is implemented by determining whether point cloud data from the target geometric model lies outside of a terminal surface of point cloud data from the source geometric model using a predetermined geometric tolerance. After performing Step "S6", the process proceeds to Step "S7".

In Step "S7", a user or operator is interrupted at the interface of the computer system when a geometric discrepancy is identified and/or a problem is encountered during converting the source geometric model to the target geometric model. After performing Step "S7", the process proceeds to Step "S8".

In Step "S8", a query is made as to whether or not the discrepancy identification is complete. If the discrepancy identification is not complete, the process returns back to Step "S6". If the discrepancy identification is complete, the process is terminated.

FIGS. 15–18 illustrate by way of example a serial interrupt interface 44 as seen from a client by a user or operator and comprising a generic CAD file overlay, or window, 130. Interrupt interface 44 is provided by way of a user display 42. User display 42 provides one implementation for a user interrupt 24 triggered by detecting a discrepancy or a problem in generating a target geometric model. Such user interface features are implemented on a client/server computer system and are presented below to illustrate one implementation of Applicant's system and method for providing a serially progressive interrupt interface with a background operation manager when translating a source geometric model to a target geometric model using a computational geometry system. According to one implementation, the computer aided design file translation system comprises a serially progressive interrupt interface which is provided by way of a pop-up interrupt interface application window 132 which is displayed within generic CAD file overlay window 130.

Figure 15:
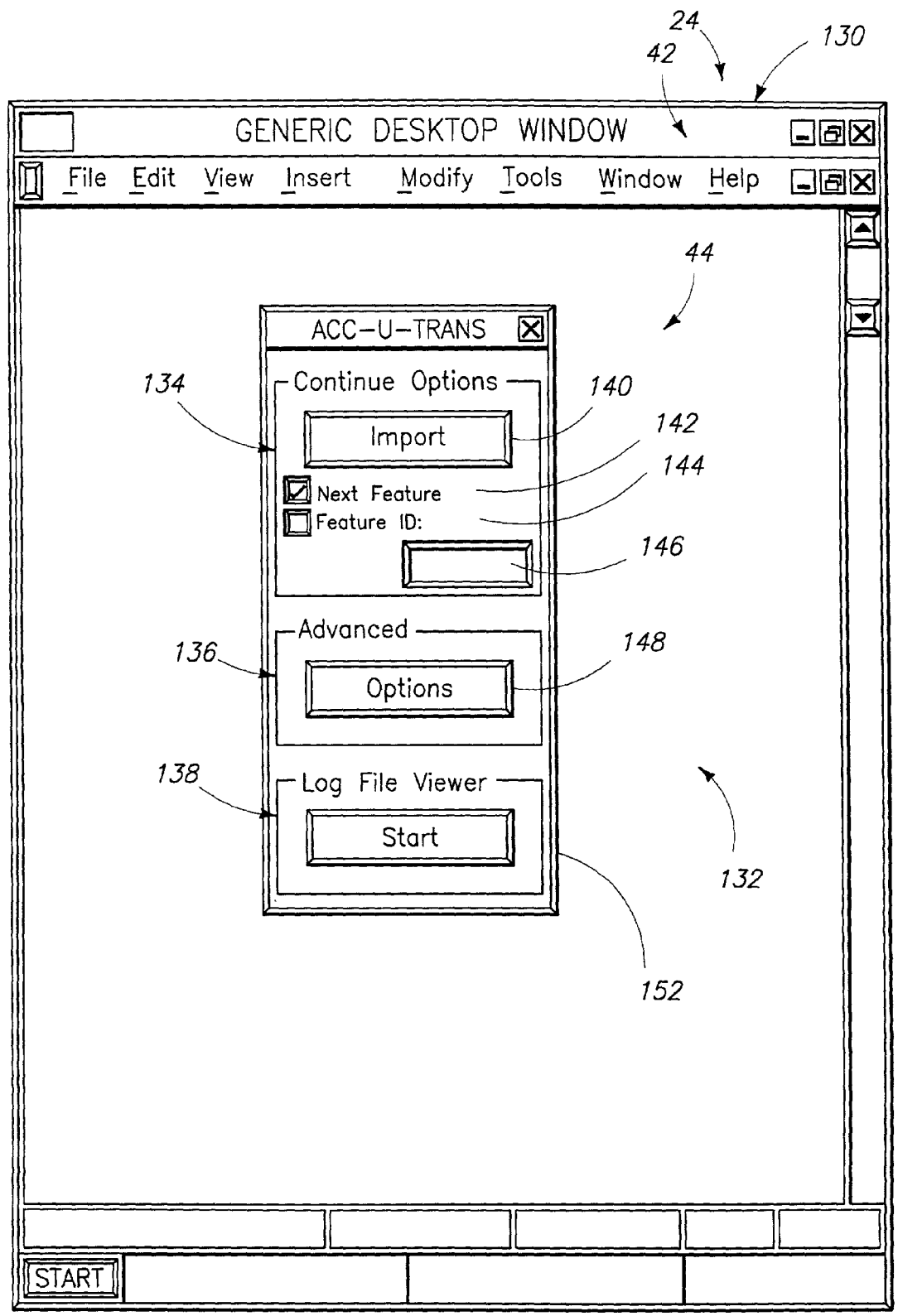
FIG. 15 is a diagram of an interrupt interface application window within a generic CAD file overlay window of a user display.

As shown in FIG. 15, a graphical user interface on a client such as the display screen is used to display serial interrupt interface 44 via displaying interrupt interface application window 132 within overlay window 130. With respect to FIGS. 15–18, each screen contains icons, or triggers, that may be clicked on in order to select different items and/or in order to navigate between screens.

FIGS. 15–18 each form diagrams of exemplary screen displays that the geometric model comparator and computer aided design file translation system provides to a user or operator during various steps when serially interrupting the operator when translating a source geometric model file to a target geometric model file and their existent inability to automatically accurately create geometry from the source geometric model file to the target geometric model file. For purposes of this disclosure, it is understood that a screen displays a portion of the computer aided design file translation system, and that the screen includes a window which is a predefined part of virtual space. Accordingly, a screen can include selection buttons, pop-up menus, pull-down menus, icons, links, buttons, scrolling lists, data entry fields, embedded content objects, radio buttons, check boxes, and other usable and selectable items that are capable of being configured or selected with a cursor using a tactile input such as a pointer, a mouse, and/or a keyboard or a button.

FIG. 15 illustrates one exemplary interrupt interface application window 132 that pops up within generic CAD file overlay window 130 in response to the computational geometry system encountering a problem or inability to automatically create an accurate geometry when translating from a source geometric model to a target geometric model. One exemplary problem that creates an inability to automatically create an accurate geometry results when the computational geometry system determines the presence of any identified discrepancies in response to comparing the geometric data between the source geometric model and the target geometric model.

The interrupt interface application window 132 of FIG. 15 includes a "Continue Options" field 134, an advanced options field 136, and a "LogFileViewer" field 138. "Continue Options" field 134 includes an import button 140 that selectively configures with a "Next Feature" check box 142 or a "Feature I.D." check box 144. "Feature I.D." check box 144 also includes a data entry field 146 for entering a desired feature identification. Such feature is entered into data entry field 146 after which check box 144 is selected such that the desired feature identification is imported when selecting import button 140. Such action continues operation or stops the translation process back up, starting with the next feature (if check box 142 is selected), or starts the process back up at the identified feature selected by way of check box 144 and data entry field 146. Advanced options field 136 includes an options button 148 that generates pop-up advanced options application window 150 of FIG. 16. "LogFileViewer" field 138 includes a start button 152 that launches a pop-up "LogFileViewer" application window 154, as shown in FIG. 17.

Figure 16:
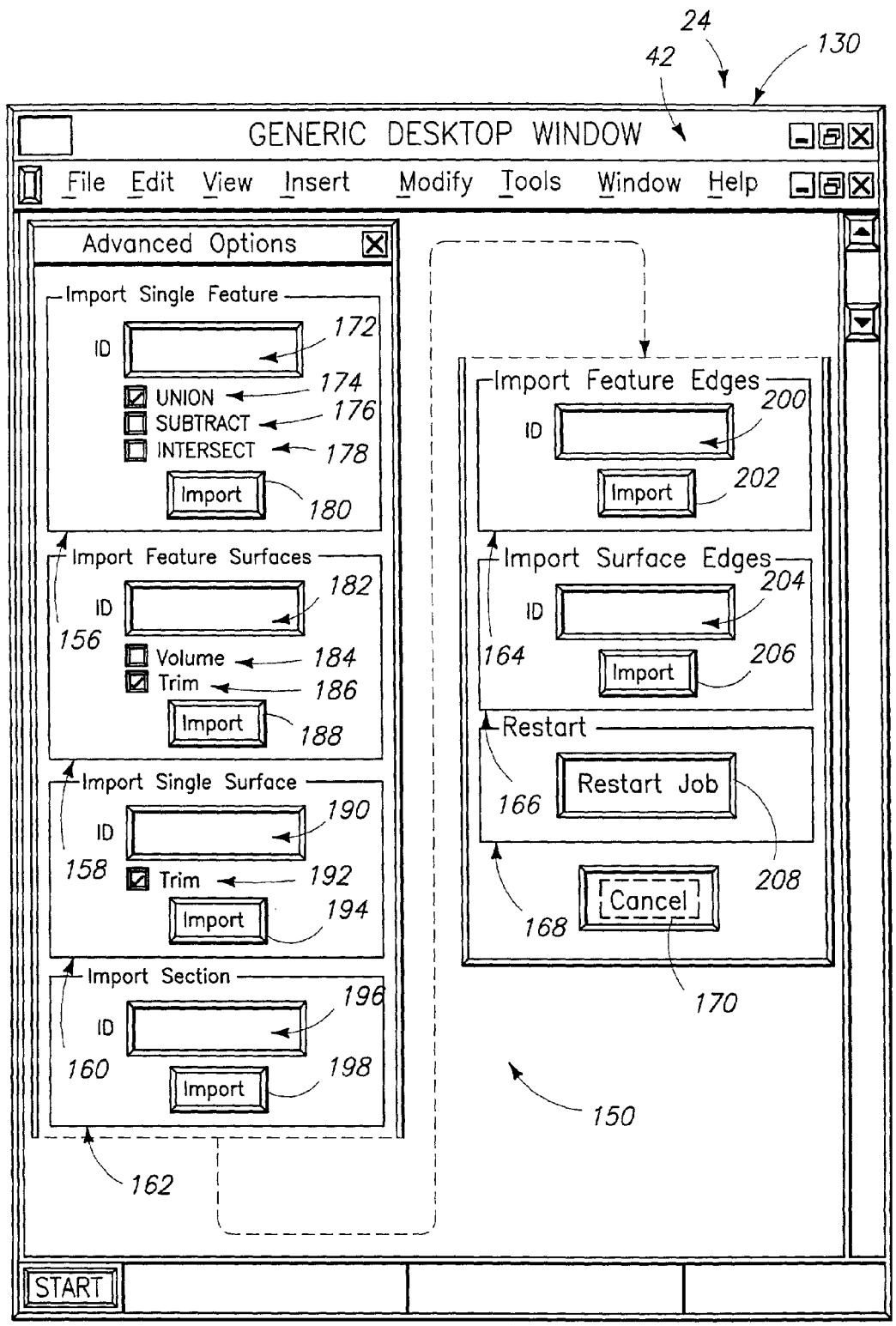
FIG. 16 is a diagram of a screen display of a pop-up advanced options application window within a generic CAD overlay window of a user display.
Figure 17:
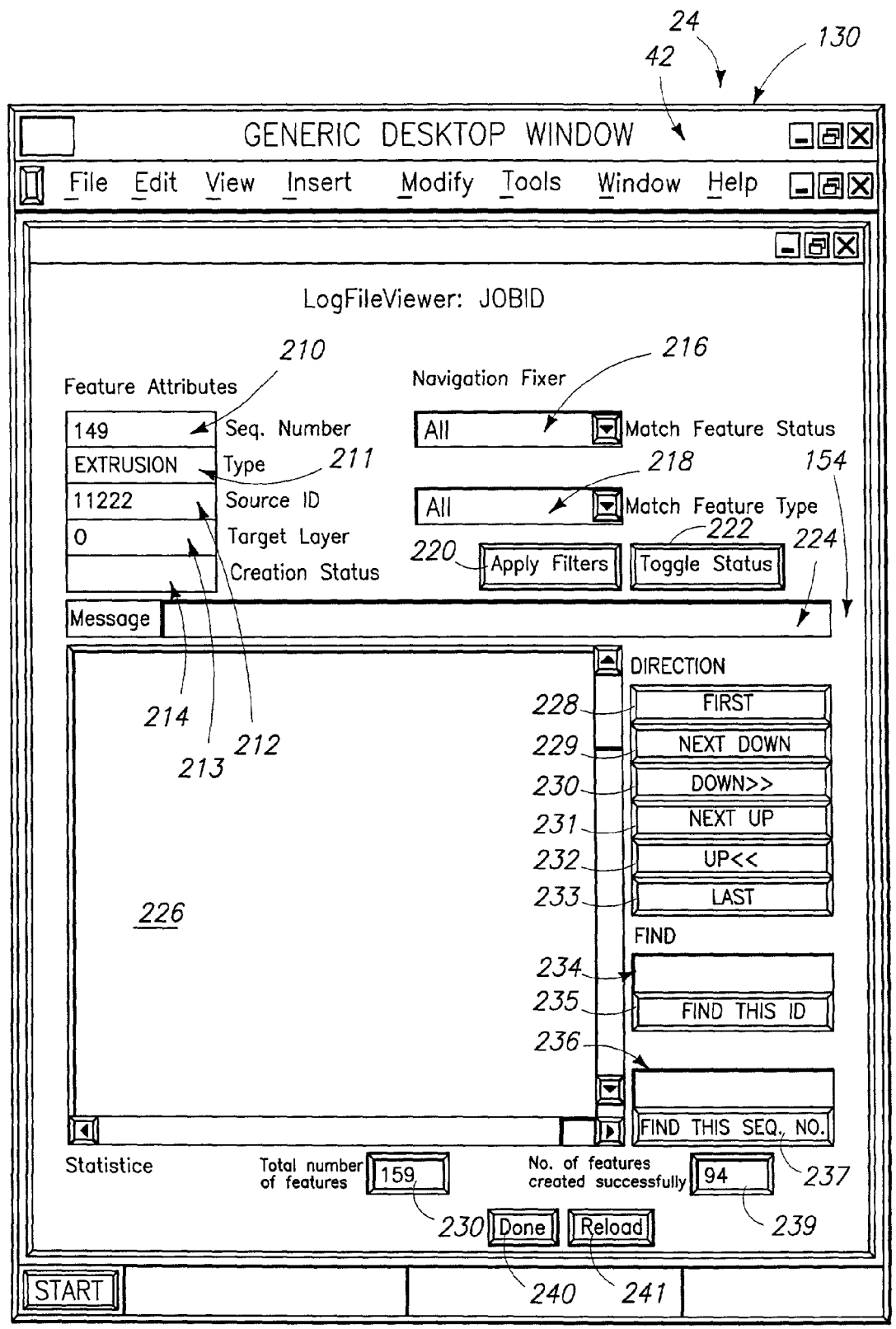
FIG. 17 is a diagram of a screen display in which a pop-up "LogFileViewer" application window is generated within a generic CAD file overlay window in a screen display.

FIG. 16 illustrates the generation of pop-up advanced options application window 150 within generic CAD overlay window 130 of user display 42. More particularly, pop-up application advanced options application window 150 comprises an import single feature field 156, an import feature surfaces field 158, an import single surface field 160, an import section field 162, an import feature edges field 164, an import surface edges field 166, and a restart field 168. Furthermore, window 150 includes a cancel button 170 which triggers closure of window 150.

Import single feature field 156 includes a data entry (or text) field 172 for inputting an import single feature identification number (or alpha-numeric) identifier. Import single feature field 156 also includes a union check box 174, a subtraction check box 176, and an intersect check box 178. Selection of boxes 174–178 in combination with input of an identification number within field 172 enables the selection of that import single feature by way of a union, a subtraction, or an intersection, respectively. After designation of the appropriate check box and input of the identification number, an import button 180 is selected by a user to import such single feature in the manner designated by the selection of the respective check box amongst check boxes 174–178.

Import feature surfaces field 158 includes a data entry (or text) identification field 182, a volume check box 184, a trim check box 186, and an import button 188. Insertion of data within field 182, selection of the appropriate check box 184 or 186, and selection of import button 188 causes importation of the identified feature surfaces by way of volume or trim, respectively.

Import single surface field 160 includes an import single surface identification data entry (or text) field 190, a trim check box 192, and an import button 194. A user provides an identification data entry number within field 190, selects trim check box 192, and import button 194 in order to cause import of a single surface having the desired identification and respective trim characteristic.

Import section field 162 includes an import section identification data entry (or text) field 196 and an import button 198. A user provides the identification within field 196 and then selects import button 198 in order to import the identified section.

Import feature edges field 164 includes an import feature edges identification data entry (or text) field 200 and an import button 202. A user imports an appropriate identification within field 200 and selects import button 202 in order to import the identified feature edge.

Import surface edges field 166 includes an import surface edges identification data entry (or text) field 204 and an import button 206. A user merely inputs an identification number within field 204 and selects import button 206 in order to import the identified surface edge. Restart field 168 includes a restart job button 208. A user selects restart job button 208 in order to restart the translation process implemented by the computer aided design filed translation system of the present invention as described above with reference to FIGS. 1–14. Finally, a user merely selects cancel button 170 in order to cancel the advanced options features provided by way of application window 150, thereby closing window 150.

FIG. 17 illustrates a screen display in which pop-up "LogFileViewer" application window 154 is generated within generic CAD file overlay window 130 in response to selection of start button 152 of FIG. 15. "LogFileViewer" application window 154 enables an operator to view a log file for a specific job that is identified by way of a job identification (JOBID). Specific feature attributes can be entered via a sequence number data entry field 210, a type data entry field 211, a source identification entry field 212, and a target layer data entry field 213. A creation status data display box 214 generates status information on the creation of the feature attribute. A navigation filter match feature status pull-down menu 216 is also provided. Furthermore, a navigation filter match feature type pull-down menu 218 is also provided. An apply filters button 220 and a toggle status button 222 are furthermore provided. Feature attribute information can be provided by way of a message box 224. Furthermore, an internal display 226 provides feature attribute information therein.

Furthermore, application window 154 includes navigation direction buttons comprising a first button 228, a next down button 229, a "down>>" button 230, a next up button 231, an "up<<" button 232, and a last button 233. Selection of first button 228 grabs the first feature attribute. Selection of button 229 moves to the next down feature attribute. Selection of button 230 moves down to the very bottom of the feature attributes. Selection of next up button 231 moves up one feature attribute. Selection of button 232 moves to the top of the feature attributes list. Selection of last button 233 moves to the very last feature attribute.

A find data entry field 234 enables a user to input a desired feature attribute, after which selection of "Find this I.D." 235 causes the navigation to the feature attribute identification provider within data entry field 234. Likewise, input of data (or an identification number) into data entry field 236 and selection of "Find this Sequence Number" 237 finds the respective identified sequence number. A "Total Number of Features" data field 238 displays the total number of features and a number of features created successfully data field 239 displays the number of features that have been successfully created. Such fields 238 and 239 are provided in a statistics format display 242 within application window 154. An "I Done" button 240 enables the designation that LogFileViewer utilization is done, thereby closing window 154. Selection of a reload button 241 reloads the LogFileViewer, relaunching application window 154.

Figure 18:
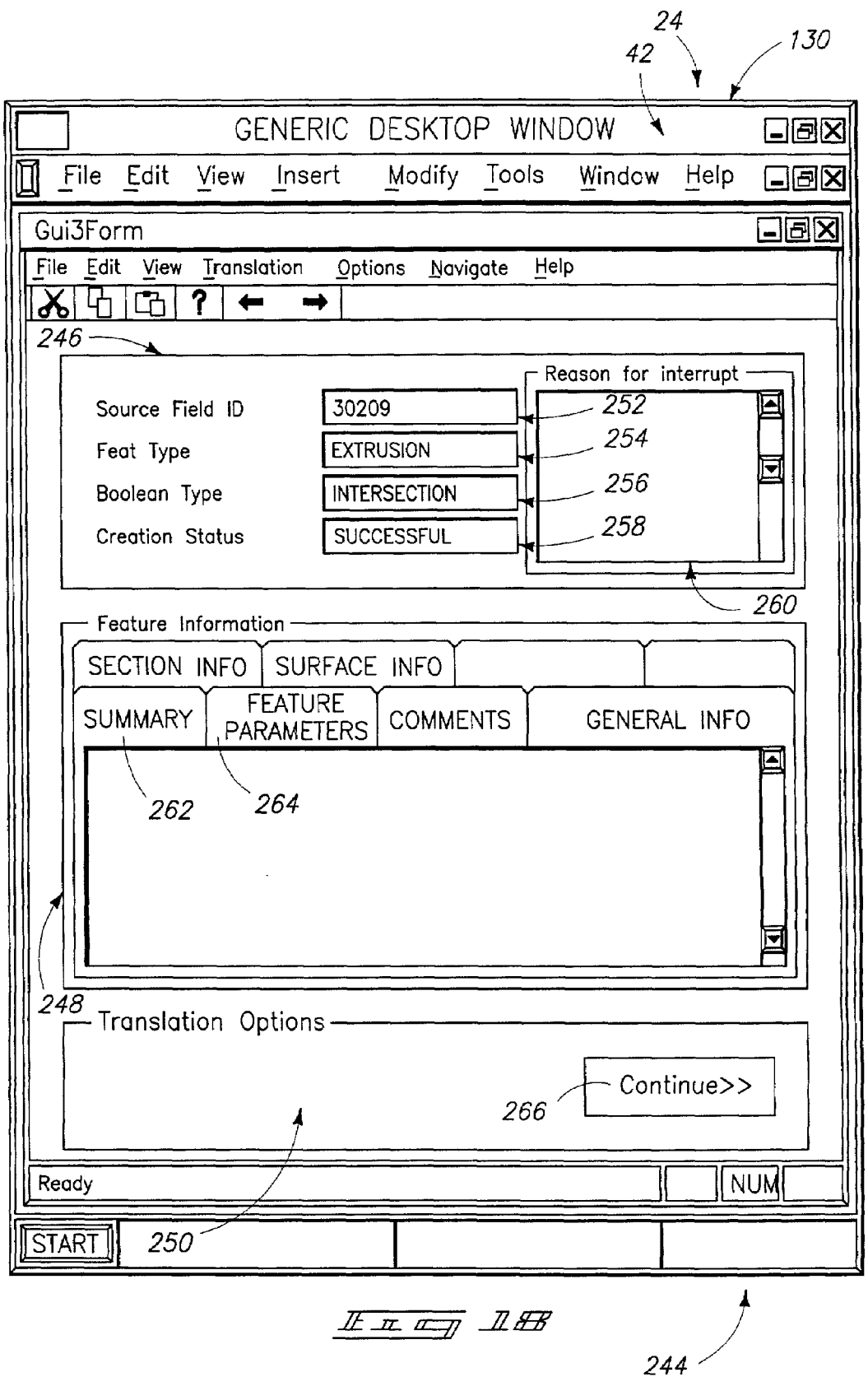
FIG. 18 is a diagram of a screen display for a pop-up graphical user interface feature identification/information application window within an overlay window in the screen display.

FIG. 18 illustrates a pop-up graphical user interface feature identification/information application window 244 which is displayed within overlay window 130 in response to selection of import button 140 of FIG. 15. Application window 244 includes a source feature identification field 246, a feature information field 248, and a translation options field 250. Source feature identification field 246 includes a source feature identification data entry field 252, a feature type data entry field 254, a Boolean type data entry field 256, and a creation status data entry field 258. Furthermore, field 246 includes a reasons for interrupt scrollable display 260. Feature information field 248 includes a plurality of tab screens such as a summary tab screen 262 comprising a summary of the feature information. A features parameters tab screen 264 includes information on feature parameters. Translation options field 250 includes a continue button 266 that enables continuation of further translation options.

Translation Process Overview

Translation Process Principles

Applicant has developed a unique approach to the task of translating Computer Assisted Design (CAD) models from one format to another. The process is designed to a) maximize the quality of the translation, b) minimize cost of translation. In order to achieve these two goals it is necessary to ascertain the geometric accuracy of the translation, and perform the translation with a minimization of human interaction time.

As to determining the geometric accuracy of the translation, a method has been developed for comparing a source CAD model (model to be translated), with a target CAD model (the translated model). The objective of this comparison is to locate and convey any differences in geometry that may exist between the two models, and convey them to an operator so that they can be resolved. For purposes of this comparison, the source model geometry is defined to be correct. The comparison method involves comparing all boundary surfaces, their trim curves, and all model edges to one another. This method is useful for locating differences in geometry, missing geometry, or extraneous geometry in the target model.

Human interaction is minimized by providing a systematic process in which operations that can be automated are done so without human input, and the operations that cannot be automated are presented to the human operator in a manner that displays the specific problem concisely and efficiently, and provides the operator with all of the information necessary to quickly arrive at the solution. Operations which can be automated are performed in the "background" while any human intervention operations are performed in the "foreground".

The translation process employs the necessary controllers and systems to notify the human operator in the event it needs assistance to resolve a specific translation problem, or has incorrectly created the geometry in the target model. When the system needs such assistance, it displays the target model to an operator along with information to help the operator determine the nature of the problem, and a satisfactory solution to it. The operator then fixes the problem, and passes control of the translation process back to the system to be completed in the background. If the system needs further assistance, it will repeat the process of notifying the operator, and displaying the problem. During the process of creating the geometry in the target model and also upon completion of translation of all the geometry, the system analyzes the quality of the translation as described above to ascertain the translation accuracy. If it finds a discrepancy or problem with either the geometry or with the process of creating the geometry, it displays the discrepancy/problem to a human operator for assistance in resolving the differences between the models.

Geometry Types

B-Rep Solid Geometry

Modern CAD systems create geometry in a number of ways. These include surfaces, curves, and solids. There are two general methods for creating and defining solid geometry. One is to create a series of boundary surfaces that enclose a volume. The CAD system can then consider the enclosed volume to be solid and have material inside or outside the solid. This type of solid is commonly called a boundary representation solid or B-Rep Solid.

FIG. 19 illustrates a solid cylinder 272 created by creating B-Rep Surfaces, such as cylindrical surface 274 and end surface 276, to enclose a volume. These boundary surfaces can be created in a variety of ways including lofting, extruding, blending, sweeping, coons patch (specific mathematical method of creating a surface based upon its boundary curves), ruled surface, revolved surface, and others. Translation of these types of features is accomplished by converting the boundary surfaces along with their boundary curves to the target CAD system, enclosing the volume in the target CAD system and creating the solid.

Constructive Solid Geometry (CSG)

The other predominant method of modeling 3D solids is CSG. This involves the creation of specific geometric features and combining them to define the final solid. The individual solid features created for the CSG method may be either "parametric" features or B-Rep solid features. "Parametric" features refer to specific geometric failures created by specifying the parameters that define a primitive (a geometric object that is fully defined by its parameters). Many parametric features use a combination of geometric entities and operations to fully define the feature. Simple primitives used in parametric features include such cuboids, cylinders, spheroids, ellipsoids, toroids, etc. Examples of more complex parametric features include sketched features where the geometric object is defined by sketching a cross-section and then extruding it a specific distance, sweeping it along a trajectory curve, or revolving it about an axis. Sketched features are more complex in that they can include just about any shape that can be sketched; however; they can still be driven by parameters by dimensionally constraining the sketches, and the extrusion depth, revolve angle, or sweep trajectory. Complex geometric features can also be created by blending solid geometry between two or more sketches using suitable mathematical algorithms.

FIG. 20 illustrates a solid model geometry 278 created by extruding a circle section to create a cylinder, sweeping another circle along a trajectory to add a swept feature and revolving a complex section to create a revolved feature. A first circle system is extended to form extended section 280. A second circle section (or sweep section) 282 is swept along a sweep trajectory 284. A complex section is revolved to create a revolved feature such as revolved section 286.

Translation of these types of features is accomplished by extracting the pertinent parameters, sections, trajectories, and other associated geometry from the source model, and recreating them in the target CAD system using the same or equivalent construction geometry and parameters.

Assembly Models

Solid models are usually organized into individual parts that are then assembled to other part models to create assembly models. Parts and sub-assemblies may be assembled together to form a higher-level assembly. Different CAD systems use different methods to accomplish this. One is to create a separate assembly model that refers to the individual part or sub-assembly models file and contains assembly constraints and part (or sub-assembly) location and orientation information in the assembly. Another is to include each part (or sub-assembly) model in the assembly model as a separate entity. Some CAD systems use a combination of the two methods described above.

FIG. 21 illustrates two methods of storing assembly model data. Translation of assembly models will require mapping of these two main types of models from one to the other when the two CAD systems use the different assembly architectures. Assembly model 288 is mapped into "Part 1" 289, "Part 2" 290, "Part 3" 291, and sub-assembly 287. Sub-assembly 287 is mapped into "Sub-Assembly Part 1" 293 and "Sub-Assembly Part 2" 295. According to another method, assembly model 288 is mapped into "Part 1" 1289, "Part 2" 1290, "Part 3" 1291, and "Sub-Assembly" 1292. "Sub-Assembly" 1292 is mapped into "Sub-Assembly Part 1" 1293 and "Sub-Assembly Part 2" 1294.

Constraints, Relations, Associations, and Solid Properties

It is common for most modern CAD software systems to assign constraints to their solid model geometry. These constraints can be geometric or dimensional for part feature geometry, and inter-part (or inter-sub-assembly) relational for assembly model geometry. In addition, relations can be established between parameters of a single feature (intra-feature relations), multiple features in the same part model (inter-feature relations), or multiple features of two or more part (or sub-assembly) models in an assembly (inter-model file relations). For example, relations can be established between features of a model in which a specific sketch plane for a feature can be related to a specific face for an existing feature, or the dimensions or parameters for a section sketch can be related to an existing feature. In this way, model behavior can be controlled in the event changes are made to the model that affect features downstream, or other parts of the assembly.

FIG. 22 illustrates the relation with a part 292 between the location of a hole 296 and a revolve axis 294 of part 292. This type of information would be extracted from the source model and reconstructed in the target CAD system in a manner that is commonly used in the target CAD system.

The solids in these models can be assigned physical properties so that the "Solid Model" can now simulate various characteristics such as mass properties, static behavior, dynamic behavior, and others. These properties can be extracted from the source model and inserted into the target model as well.

Operator Tool Set Theory of Operation

Overview

The purpose of an operator toolset is to improve the efficiency of CAD model file translations by providing the operator with the information necessary to: recognize when and where the target model geometry is different from the source model geometry; complete the creation of geometric features that cannot be translated automatically by software; and allow for the conveyance of the necessary geometric information without requiring the operator to refer to the source CAD model file.

Applicant has developed a set of tools that does several things. First, the set of tools shows the operator where the surfaces and edges of the corresponding geometric features of the other CAD model are located in relation to the target model. Secondly, the set of tools details the status of each geometric feature that was converted. Thirdly, the set of tools informs the operator of the type of each geometric feature in the source model along with the methods and parameters used to construct them. Finally, the set of tools displays the required parameters and references required to complete features that were not automatically constructed in the target CAD system.

By providing the operator with this detailed information, the operator can quickly and efficiently complete CAD model file translations that duplicate as much as possible the original design intent, and are accurate.

Geometry Deviations

Point Cloud Displaying Bad Geometry

Applicant's translation system uses the Geometric Analyzer (GA) that it has developed to determine if and where two CAD model files are geometrically different. Once the differences have been determined by the GA, the bad points are displayed in the target model file. By directly viewing these representations of where the surfaces and edges of the erroneous geometric features are supposed to be, the operator can determine the nature of the discrepancy.

FIG. 23 illustrates an exemplary target model 298 having bad points 300. Bad points 300 indicate an incorrectly translated fillet radius.

Surface Representations

If desired, an operator can import a Non-Uniform Rational B-Spline Surface (NURBS) from the surfaces of selected features directly from the source model file, providing the operator with points along the surfaces and edges as well as the surfaces themselves. A NURBS surface is a standard format provided by Applicant for exporting CAD surface information to enable translation and analysis. Most CAD systems possess the functionality necessary to export NURBS (or NURB surfaces).

FIG. 24 illustrates a surface 302 from the source model provided on the target model 298. Accordingly, surface 302 enables an operator to visualize where an erroneous fillet surface should be on target model 298.

Analysis Report

An analysis report is displayed to the operator detailing the type of analysis that was performed, and the quantity of errors found. If the translation is completely accurate, the report summary quickly indicates to the operator that there are no discrepancies. The operator can quickly move to the next analysis, or the next job without the need to review the model, thus saving the operator inspection time.

When analysis reveals inconsistencies between the source and target models, the report indicates to the operator how many points are not within tolerance. Therefore, the operator is given an indication of how much of the model file is erroneous.

Translation Log Viewer

Applicant has developed a Log File Viewer that provides the operator with essential information including feature regeneration status, feature identification mapping between the source and target CAD systems, and partial geometry identifications. The operator can toggle the display parameters to display any combination of features including successfully completed features, failed features, and feature types. This allows the operator to quickly sort through the translated model file and get essential information on any feature desired.

In addition, the log file for each feature displays information regarding where to find a feature's construction geometry such as the section(s), and trajectory (if applicable). This allows the operator to quickly filter to the desired information and find the desired geometry in the target model file.

Failed Feature Aids

In the event that a feature fails to be created in the target model file, then one or more of the following aids will be inserted into the model to assist the operator in interactively creating the failed feature.

Defining Parameter Indication

Certain feature types such as rounds (fillets) and drafts will have their defining parameter and reference information displayed to the operator. For example, if a fillet fails, then the associated model edges that are supposed to be filleted will be highlighted. In addition, the radius of the fillet will be displayed with a leader pointing to the specific edge or edges to which the radius is to be applied.

Figure 25:
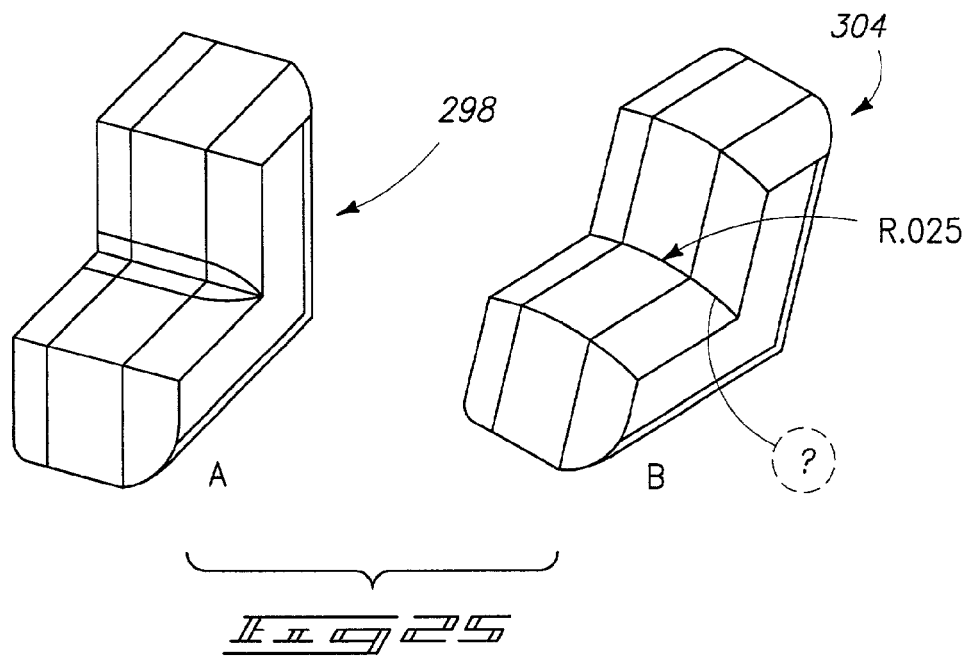
FIG. 25 is a simplified schematic diagram illustrating a source model for a target model having a failed fillet that is annotated with defining parameters and references.

For example, FIG. 25 illustrates a source model 297 for target model 298 (shown in FIGS. 23–25). FIG. 25B illustrates a failed fillet 306 which has been annotated with defining parameters and references.

Likewise, drafts will be noted by placing the neutral plan in place, and highlighting the specific surfaces to apply the draft that applies to the specific surface(s). The draft angle will be indicated with a leader to the surfaces. Similar information can be provided for chamfers, patterns, copied or translated (moved) features, and mirrored features.

Construction Geometry for Failed Features

When a feature fails in the target model, usually the construction geometry required to create the feature is created in the target model. For example, a swept cut in which the cut section is a circle and is being swept along a trajectory curve might fail to actually build the cut in the target model. However, the section and the trajectory are placed in the model in the correct locations.

Figure 26:
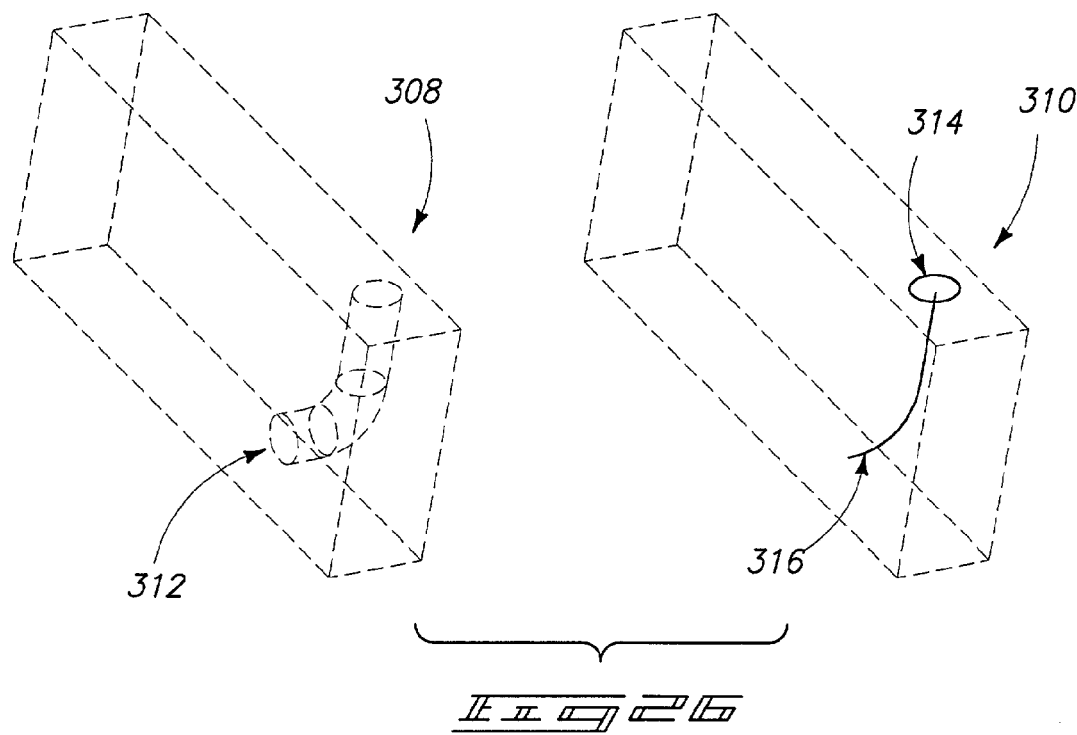
FIG. 26 is a simplified schematic diagram illustrating a source model having a sweep feature in a target model that has failed to build a sweep feature, but has placed construction geometry in the model.

FIG. 26A illustrates a source model having a sweep feature 312. FIG. 26B illustrates a corresponding target model 310 having a sweep section 314 and a sweep trajectory 316. Target model 310, as illustrated, has failed to build sweep feature 312 correctly, but has placed the construction geometry into the model.

The operator merely needs to interactively complete the sweep operation selecting the section and trajectory when prompted to do so by the CAD system.

Import Surfaces of Failed Features

The surface representations that are described above in the Geometry Deviations section are very accurate representations of the individual surfaces that exist in the source model. These surfaces are automatically placed in the target model by Applicant's translation system in the event a feature fails. An operator can interactively use these surfaces to create a boundary representation (B-Rep) of the failed feature, thereby completing the feature.

The surfaces can also be used by the operator simply as an aid in determining what the specific feature should look like. If an operator decides to build the feature using parametric or other common techniques instead of a B-Rep, then the new feature can be compared to the surfaces as an alternative method of determining accuracy. The surface could also be used to assist in generating necessary construction geometry for the feature by using its edges, or important intersections with other features as guides. Therefore, the surface can be a very powerful tool for the operator to finish features that for some reason could not be translated by software alone.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A machine-executed method for comparing computational geometry system translations, comprising:
    extracting point cloud data from geometric data in a pre-existing source geometric model and pre-existing source geometric data related to one of a surface, an edge, a curve, and an alternative geometric entity in the source CAD system;
    generating translated target geometric data in a target CAD system using the pre-existing source geometric model, the translated target geometric data comprising point cloud data extracted from geometric data in the translated target geometric model and translated target geometric data related to one of a surface, an edge, a curve, and an alternative geometric entity in the target CAD system;
    comparing the point cloud data extracted from geometric data in the pre-existing source geometric model with the translated target geometric data related to one of a surface, an edge, a curve, and an alternative geometric entity in the target CAD system, and reversely comparing the point cloud data extracted from geometric data in the translated target geometric model with the pre-existing source geometric data related to one of a surface, an edge, a curve, and an alternative geometric entity in the source CAD system to identify a discrepancy between the translated target geometric data and the pre-existing source geometric data; and
    after comparing, visually displaying to a user the identified discrepancy in the translated target geometric model or source geometric model if the identified discrepancy is beyond a pre-determined distance tolerance set by the user.

2. The method of claim 1 wherein, after identifying a discrepancy, further comprising identifying another discrepancy between the point cloud data extracted from geometric data in the pre-existing source geometric model and the translated target geometric data related to one of a surface, an edge, a curve, and an alternative geometric entity in the target CAD system, and reversely between the point cloud data extracted from geometric data in the translated target geometric model with the pre-existing source geometric data related to one of a surface, an edge, a curve, and an alternative geometric entity in the source CAD system, and notifying the user after comparison, if the identified another discrepancy is beyond the pre-determined distance tolerance set by the user.

3. The method of claim 1 wherein, after extracting the pre-existing source geometric model, further comprising opening the pre-existing source geometric model using the source CAD system.

4. The method of claim 1 wherein, after opening the pre-existing source geometric model using the source CAD system, extracting the point cloud data from geometric data in the source geometric model.

5. The method of claim 4 further comprising storing the extracted source comparison reference data in a metafile format.

6. The method of claim 1 wherein, after generating translated target geometric data for the translated target geometric model, further comprising opening the translated target geometric model using the target CAD system.

7. The method of claim 1 wherein, after opening the translated target geometric model using the target CAD system, extracting the point cloud data from geometric data in the target geometric model.

8. The method of claim 7 further comprising storing the extracted target comparison reference data in a metafile format.

9. A machine-executed method for implementing a geometric model conversion on a computer system, the method comprising:
receiving a pre-existing source geometric model at a computer;
storing the pre-existing source geometric model in memory of the computer;
converting the pre-existing source geometric model to a translated target geometric model;
extracting source comparison reference data from the pre-existing source geometric model, the source comparison reference data comprising point cloud data extracted from the geometric data in the pre-existing source geometric model and pre-existing source geometric data related to one of a surface, an edge, a curve, and an alternative geometric entity in the source CAD system;
extracting target comparison reference data from the translated target geometric model, the target comparison reference data comprising point cloud data extracted from geometric data in the translated target geometric model and translated target geometric data related to one of a surface, an edge, a curve, and an alternative geometric entity in the target CAD system; and
comparing the point cloud data extracted from the pre-existing source geometric model with the translated target geometric data related to one of a surface, an edge, a curve, and an alternative geometric entity in the target CAD system, and reversely comparing the point cloud data extracted from the translated target geometric model with the pre-existing source geometric data related to one of a surface, an edge, a curve, and an alternative geometric entity in the source CAD system to identify a discrepancy between the translated target geometric data and the pre-existing source geometric data.

10. The method of claim 9 wherein comparing comprises determining whether point cloud data from the translated target geometric model lies outside of one of a surface, an edge, a curve, and an alternative geometric entity from the pre-existing source geometric model using a pre-determined distance tolerance set by a user.

11. The method of claim 9 wherein comparing comprises determining whether point cloud data from the source geometric model lies outside of one of a surface, an edge, a curve, and an alternative geometric entity from the translated target geometric model using a pre-determined distance tolerance set by a user.

12. The method of claim 9 wherein the point cloud data from the pre-existing source geometric model identifies one of a surface, an edge of a surface, a curve, and an alternative geometric entity in the pre-existing source geometric model and the point cloud data from the translated target geometric model identifies one of a surface, an edge of a surface, a curve, and an alternative geometric entity in the translated target geometric model.

13. The method of claim 9, responsive to comparing, notifying a user, after a geometric discrepancy is identified, if the identified discrepancy is beyond a pre-determined distance tolerance.

14. The method of claim 9, responsive to converting, interrupting a user through a user interface when a problem is encountered during converting the pre-existing source geometric model to the translated target geometric model.

15. A geometric model comparator, comprising:
processing circuitry configured to generate a translated target geometric model from a pre-existing source geometric model;
memory configured to store the pre-existing source geometric model and the translated target geometric model; and
comparison circuitry configured to:
identify selected point cloud data points from the pre-existing source geometric model,
identify selected point cloud data points in a translated target geometric model;
compare the point cloud data extracted from the pre-existing source geometric model with the translated target geometric data related to one of a surface, an edge, a curve, and an alternative geometric entity in the target CAD system to identify one of a surface, an edge, a curve, and an alternative geometric entity from the translated target geometric model that falls outside of a predetermined distance tolerance with the respective one or more points of the point cloud data from the pre-existing source geometric model; and
compare the point cloud data extracted from the translated target geometric model with the pre-existing source geometric data related to one of a surface, an edge, a curve, and an alternative geometric entity in the source CAD system to identify one of a surface, an edge, a curve, and an alternative geometric entity from the pre-existing source geometric model that falls outside of a predetermined distance tolerance with the respective one or more points of the point cloud data from the translated target geometric model.

16. The comparator of claim 15 wherein the comparison circuitry implements a forward comparison between the selected point cloud data points from the pre-existing source geometric model and one of a surface, an edge, a curve, and an alternative geometric entity of the translated target geometric model in target CAD system.

17. The comparator of claim 15 wherein the comparison circuitry implements a reverse comparison between one of a surface, an edge, a curve, and an alternative geometric entity of the pre-existing source geometric model and the respective selected point cloud data points from the translated target geometric model.

18. The comparator of claim 15 wherein the comparison circuitry implements a bi-directional comparison between one of a surface, an edge, a curve, and an alternative geometric entity of the pre-existing source geometric model and the respective selected point cloud data points from the translated target geometric model and between the selected point cloud data points from the pre-existing source geometric model and one of a surface, an edge, a curve, and an alternative geometric entity of the translated target geometric model.

19. The comparator of claim 15 wherein the comparison circuitry implements a bounding box comparison comprising comparison of a minimized box that fits around selected points from the translated target geometric model with a minimized box that fits around one of a curve, an edge, a surface, and an alternative geometric entity of the pre-existing source geometric model.

20. The comparator of claim 15 wherein the comparison circuitry implements a bounding box comparison comprising comparison of a minimized box that fits around selected points from the source geometric model with a minimized box that fits around one of a curve, an edge, a surface, and an alternative geometric entity of the translated target geometric model.

21. The comparator of claim 15 wherein the comparison circuitry is configured to measure a distance from a selected point in the point cloud data of translated target geometric model to the nearest geometric entity in the source geometric model and reversely measure a distance from a selected point in the point cloud data of source geometric model to the nearest geometric entity in the translated target geometric model and if the distance fall outside of a pre-determined distance tolerance, initiate notification of a user of the geometric model comparator of a discrepancy between the translated target geometric model and the pre-existing source geometric model.

22. The comparator of claim 15 wherein the comparison circuitry saves selected different points having the discrepancy between the pre-existing source geometric model and the translated target geometric model into an error file comprising points in the point cloud that are outside a pre-determined distance tolerance.

23. A geometric model translation system, comprising:
memory to receive input data of a pre-existing source geometric model;
processing circuitry configured to convert the input data of the pre-existing source geometric model into corresponding output data of a translated target geometric model, wherein the processing circuitry extracts source comparison reference data from the pre-existing source geometric model and target comparison reference data from the translated target geometric model, and wherein the source comparison reference data comprises point cloud data extracted from geometric data in the pre-existing source geometric model and pre-existing source geometric data related to one of a surface, an edge, a curve, and an alternative geometric entity in the source CAD system and target comparison reference data comprises point cloud data extracted from geometric data in the translated target geometric model and translated target geometric data related to one of a surface, an edge, a curve, and an alternative geometric entity in the target CAD system;
a geometric model comparator implemented in the processing circuitry and configured to compare the point cloud data extracted from the pre-existing source geometric model with the translated target geometric data related to one of a surface, an edge, a curve, and an alternative geometric entity in the target CAD system, and reversely compare the point cloud data extracted from the translated target geometric model with the pre-existing source geometric data related to one of a surface, an edge, a curve, and an alternative geometric entity in the source CAD system to identify a discrepancy between the translated target geometric data and the pre-existing source geometric data.

24. The system of claim 23 wherein the source comparison reference data is stored in a metafile format.

25. The system of claim 23 wherein the geometric model comparator is implemented in the processing circuitry.

26. The system of claim 23 wherein a target geometric output file is generated comprising translated point cloud data points corresponding to the geometric location of at least one of an edge, a surface, a curve, and an alternative geometric entity of the pre-existing source geometric model.

27. The system of claim 23 wherein the target comparison reference data is stored in a metafile format.

28. The system of claim 23 wherein a source geometric output file is generated comprising translated point cloud data points corresponding to the geometric location of at least one of an edge, a surface, a curve, and an alternative geometric entity of the target geometric model.

29. A machine-executed method for implementing a geometric model conversion on a computer system, the method comprising:
receiving a pre-existing source geometric model at a computer;
storing the pre-existing source geometric model in memory of the computer;
converting the pre-existing source geometric model to a translated target geometric model;
extracting source reference data from the pre-existing source geometric model and target reference data from the translated target geometric model, wherein the source reference data comprises point cloud data extracted from geometric data in the pre-existing source geometric model and target reference data comprises point cloud data extracted from geometric data in the translated target geometric model;
importing the source reference data into the translated target geometric model and the target reference data into the pre-existing source geometric model;
comparing the extracted source reference data with one of a surface, an edge, a curve, and an alternative geometric entity from the translated target geometric model in a target CAD system to identify geometric discrepancy between them; and
comparing the target reference data with one of a surface, an edge, a curve, and an alternative geometric entity from the pre-existing source geometric model in a source CAD system, to identify geometric discrepancy between them.

* * * * *